US012562782B2

(12) United States Patent
Elshafie et al.

(10) Patent No.: US 12,562,782 B2
(45) Date of Patent: Feb. 24, 2026

(54) BEAMFORMING TECHNIQUES USING RANDOM-BASED PARAMETER SELECTION AT RECONFIGURABLE INTELLIGENT SURFACES

(71) Applicant: QUALCOMM INCORPORATED, San Diego, CA (US)

(72) Inventors: Ahmed Elshafie, San Diego, CA (US); Yu Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 326 days.

(21) Appl. No.: 18/549,162

(22) PCT Filed: Apr. 12, 2021

(86) PCT No.: PCT/CN2021/086499
§ 371 (c)(1),
(2) Date: Sep. 5, 2023

(87) PCT Pub. No.: WO2022/217408
PCT Pub. Date: Oct. 20, 2022

(65) Prior Publication Data
US 2024/0162939 A1 May 16, 2024

(51) Int. Cl.
*H04W 72/23* (2023.01)
*H04B 7/04* (2017.01)
(Continued)

(52) U.S. Cl.
CPC ....... *H04B 7/04013* (2023.05); *H04B 7/0617* (2013.01); *H04L 5/0051* (2013.01); *H04W 72/231* (2023.01)

(58) Field of Classification Search
CPC ........... H04W 72/231; H04W 72/0446; H04W 72/23; H04W 52/02; H04W 72/14;
(Continued)

(56) References Cited

U.S. PATENT DOCUMENTS

| | | | | |
|---|---|---|---|---|
| 2013/0294318 A1* | 11/2013 | Amerga | ................. | H04W 4/06 370/312 |
| 2019/0013857 A1 | 1/2019 | Zhang et al. | | |
| 2019/0149256 A1* | 5/2019 | Davydov | ............... | H04B 7/063 375/267 |

FOREIGN PATENT DOCUMENTS

| | | |
|---|---|---|
| CN | 111181615 A | 5/2020 |
| CN | 111245492 A | 6/2020 |

(Continued)

OTHER PUBLICATIONS

Nadeem Q-U-A., et al., "Reconfigurable Surface Assisted Multi-User Opportunistic Beamforming", 2020 IEEE International Symposium On Information Theory (ISIT), IEEE, Jun. 21, 2020, pp. 2971-2976, XP033814014, figure 1.
(Continued)

*Primary Examiner* — Wei Zhao
(74) *Attorney, Agent, or Firm* — Holland & Hart LLP

(57) ABSTRACT

Methods, systems, and devices for wireless communications are described in which a transmitting device may transmit a set of reference signals to a receiver via a configurable surface such as a reconfigurable intelligent surface (RIS). The RIS may randomly adjust one or more parameters for one or multiple RIS elements to provide different beamformed parameters for reflected instances of each reference signal from the RIS. Each reference signal may have a corresponding reference signal index value, and the receiver may provide an indication of a selected the reference signal index value based on channel measurements of the reference signals. The transmitting device may provide an indication to the RIS of the index value, and may communicate with the receiver based on the selected reference signal via the RIS, where the RIS uses the parameters associated with the RIS index value for the communications.

30 Claims, 17 Drawing Sheets

(51) Int. Cl.
    *H04B 7/06*         (2006.01)
    *H04L 5/00*         (2006.01)
    *H04W 72/231*     (2023.01)

(58) Field of Classification Search
    CPC ... H04L 5/0051; H04L 5/005; H04B 7/04013;
                           H04B 7/0617
    See application file for complete search history.

(56)               References Cited

FOREIGN PATENT DOCUMENTS

| | | | |
|---|---|---|---|
| CN | 111245494 A | | 6/2020 |
| CN | 111901802 A | | 11/2020 |
| CN | 112532547 A | | 3/2021 |
| WO | WO-2020254031 A1 | | 12/2020 |

OTHER PUBLICATIONS

Supplementary European Search Report—EP21936304—Search Authority—The Hague—Dec. 17, 2024.
Huawei, et al., "Enhancement for UL AoA Positioning", 3GPP TSG RAN WG1 Meeting #104-e, R1-2100237, E-meeting, Jan. 25-Feb. 5, 2021, the whole document, 10 Pages.
International Search Report and Written Opinion—PCT/CN2021/086499—ISA/EPO—Jan. 17, 2022.

\* cited by examiner

610

620

615

605

600

Reference Signal Manager

825

Beamforming Manager

830

RIS Capability Manager

835

Training Manager

840

820

800

Figure 14:
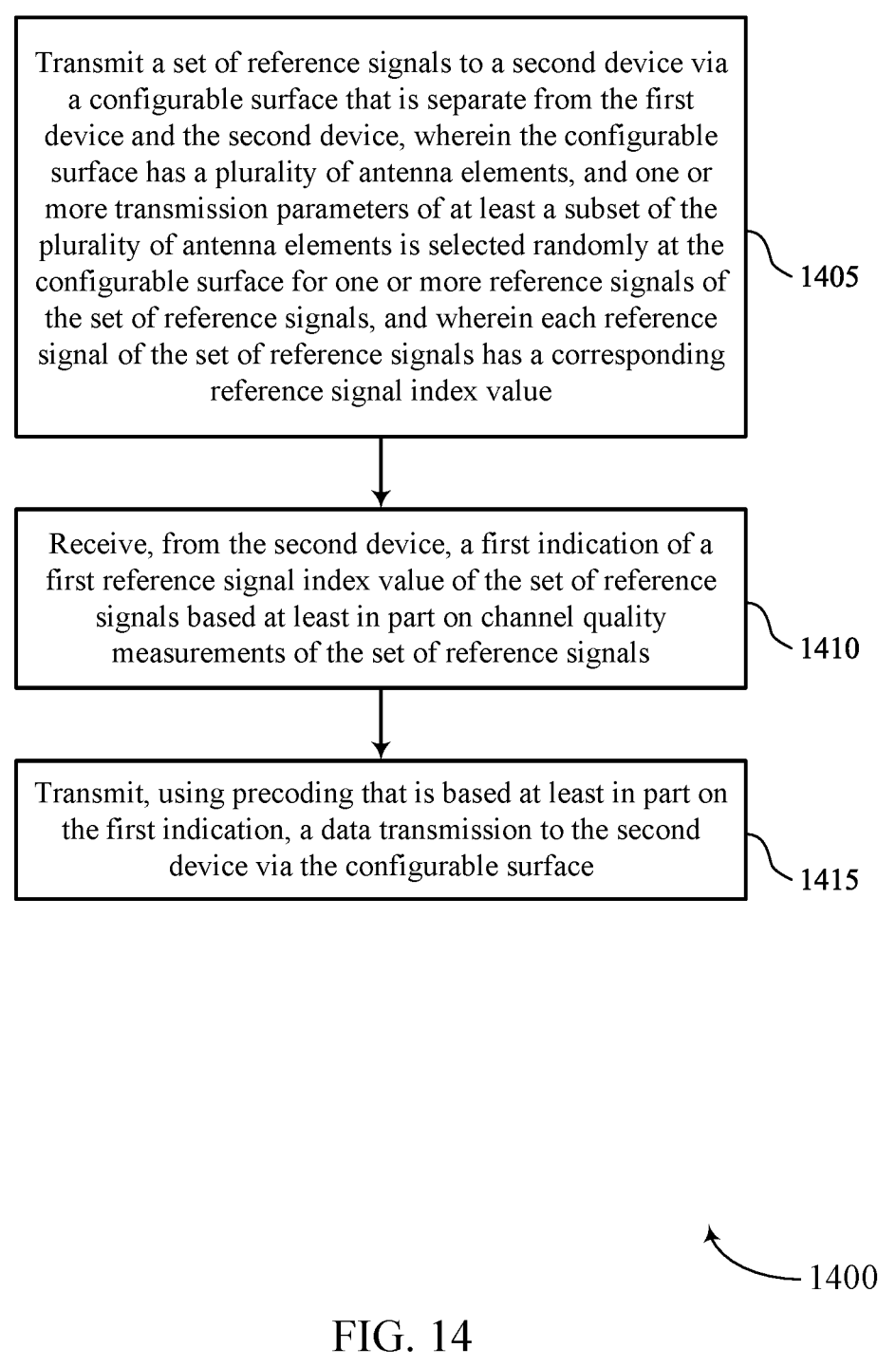

Transmit a set of reference signals to a second device via a configurable surface that is separate from the first device and the second device, wherein the configurable surface has a plurality of antenna elements, and one or more transmission parameters of at least a subset of the plurality of antenna elements is selected randomly at the configurable surface for one or more reference signals of the set of reference signals, and wherein each reference signal of the set of reference signals has a corresponding reference signal index value

1405

Receive, from the second device, a first indication of a first reference signal index value of the set of reference signals based at least in part on channel quality measurements of the set of reference signals

1410

Transmit, using precoding that is based at least in part on the first indication, a data transmission to the second device via the configurable surface

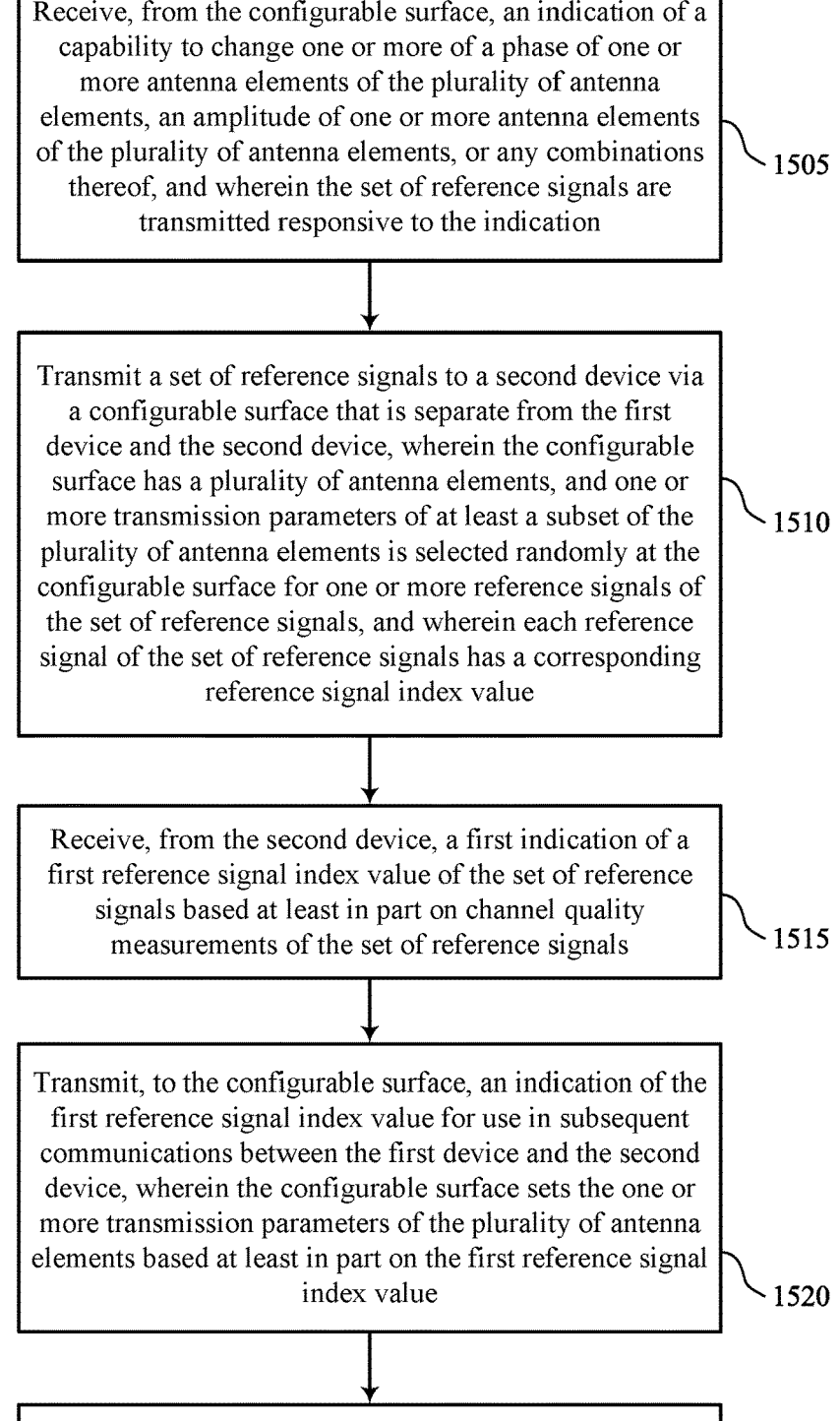

Receive, from the configurable surface, an indication of a capability to change one or more of a phase of one or more antenna elements of the plurality of antenna elements, an amplitude of one or more antenna elements of the plurality of antenna elements, or any combinations thereof, and wherein the set of reference signals are transmitted responsive to the indication

1505

Transmit a set of reference signals to a second device via a configurable surface that is separate from the first device and the second device, wherein the configurable surface has a plurality of antenna elements, and one or more transmission parameters of at least a subset of the plurality of antenna elements is selected randomly at the configurable surface for one or more reference signals of the set of reference signals, and wherein each reference signal of the set of reference signals has a corresponding reference signal index value

1510

Receive, from the second device, a first indication of a first reference signal index value of the set of reference signals based at least in part on channel quality measurements of the set of reference signals

1515

Transmit, to the configurable surface, an indication of the first reference signal index value for use in subsequent communications between the first device and the second device, wherein the configurable surface sets the one or more transmission parameters of the plurality of antenna elements based at least in part on the first reference signal index value

1520

Transmit, using precoding that is based at least in part on the first indication, a data transmission to the second device via the configurable surface

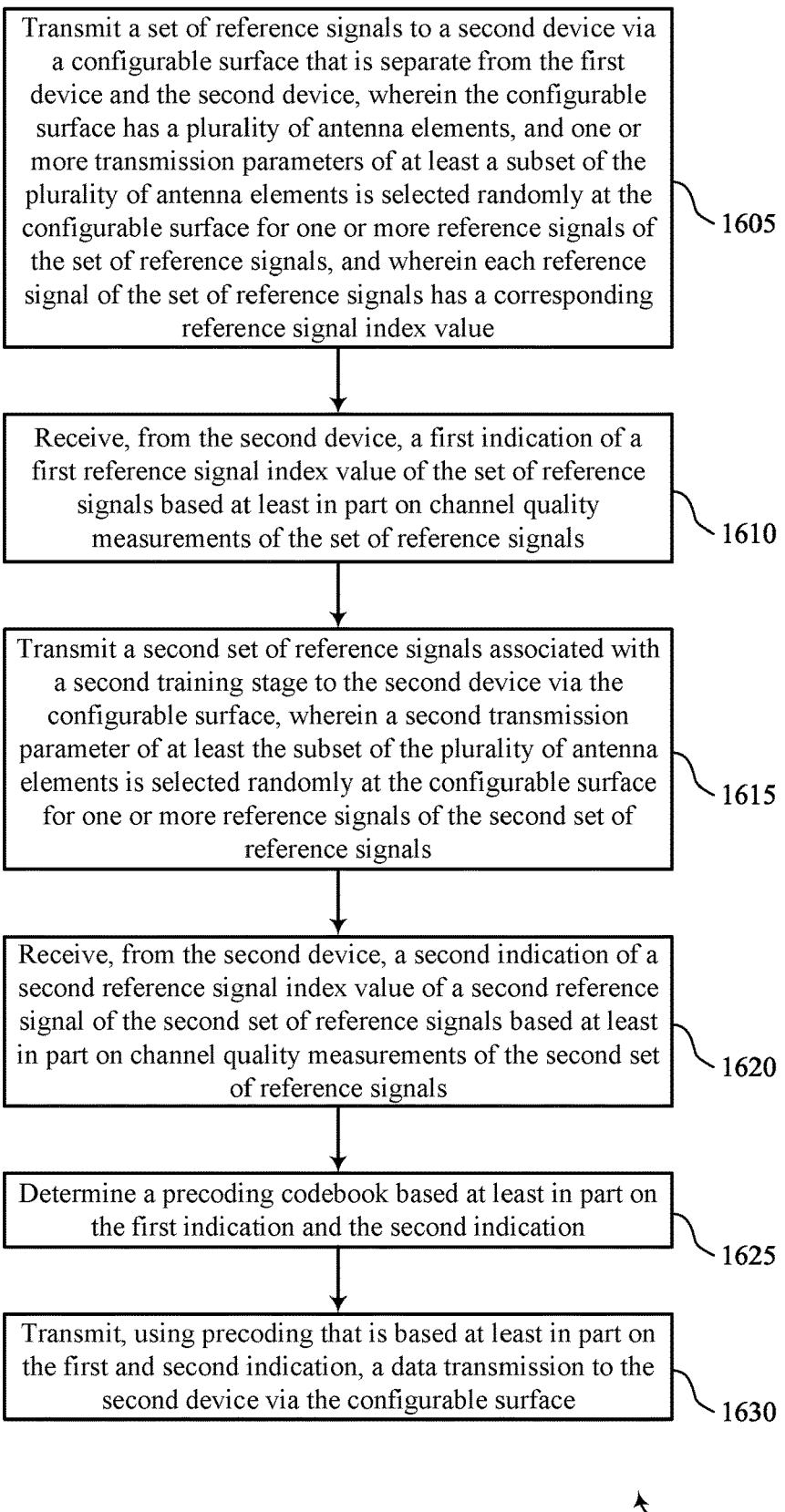

Transmit a set of reference signals to a second device via a configurable surface that is separate from the first device and the second device, wherein the configurable surface has a plurality of antenna elements, and one or more transmission parameters of at least a subset of the plurality of antenna elements is selected randomly at the configurable surface for one or more reference signals of the set of reference signals, and wherein each reference signal of the set of reference signals has a corresponding reference signal index value

1605

Receive, from the second device, a first indication of a first reference signal index value of the set of reference signals based at least in part on channel quality measurements of the set of reference signals

1610

Transmit a second set of reference signals associated with a second training stage to the second device via the configurable surface, wherein a second transmission parameter of at least the subset of the plurality of antenna elements is selected randomly at the configurable surface for one or more reference signals of the second set of reference signals

1615

Receive, from the second device, a second indication of a second reference signal index value of a second reference signal of the second set of reference signals based at least in part on channel quality measurements of the second set of reference signals

1620

Determine a precoding codebook based at least in part on the first indication and the second indication

1625

Transmit, using precoding that is based at least in part on the first and second indication, a data transmission to the second device via the configurable surface

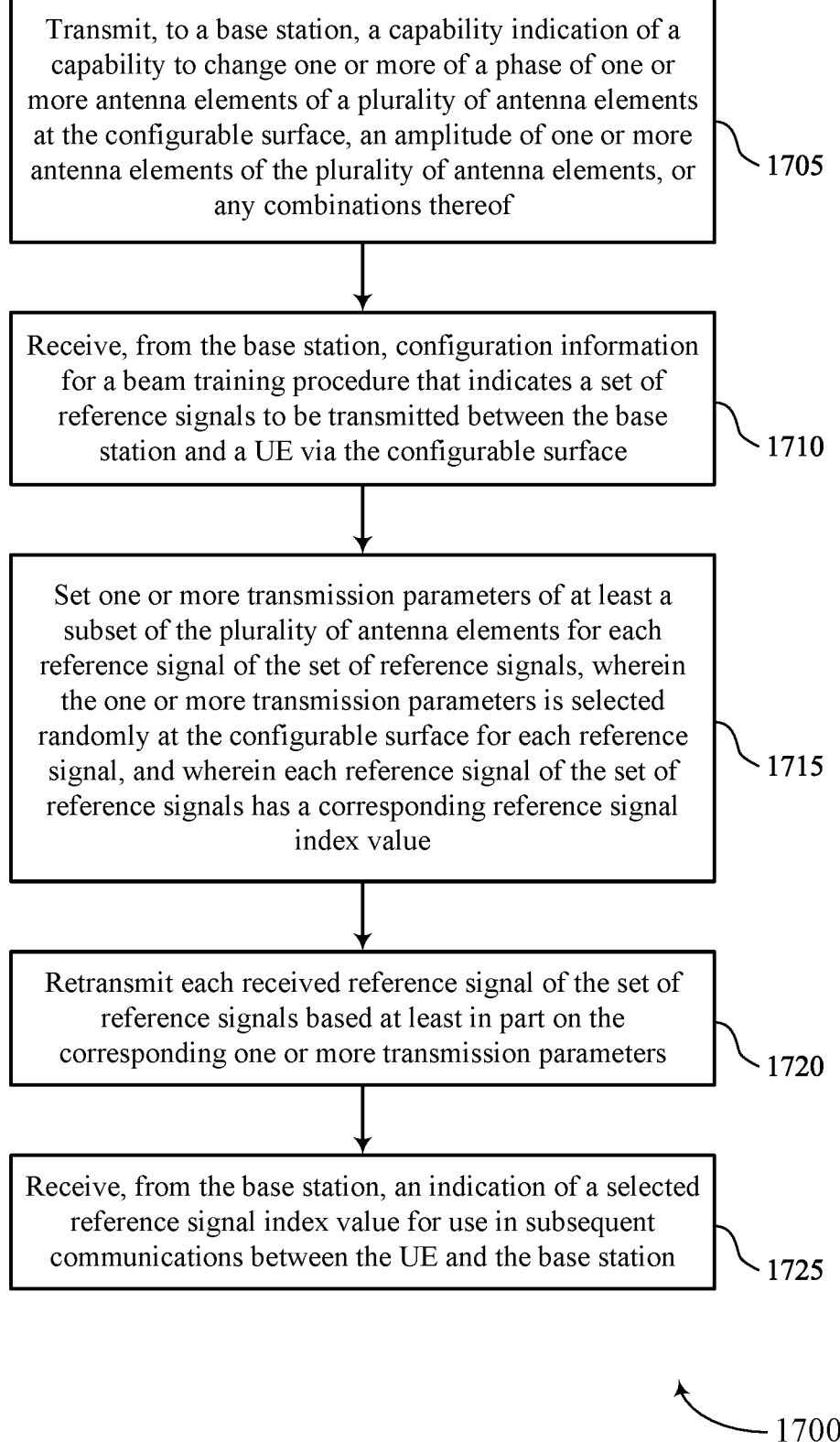

Transmit, to a base station, a capability indication of a capability to change one or more of a phase of one or more antenna elements of a plurality of antenna elements at the configurable surface, an amplitude of one or more antenna elements of the plurality of antenna elements, or any combinations thereof

1705

Receive, from the base station, configuration information for a beam training procedure that indicates a set of reference signals to be transmitted between the base station and a UE via the configurable surface

1710

Set one or more transmission parameters of at least a subset of the plurality of antenna elements for each reference signal of the set of reference signals, wherein the one or more transmission parameters is selected randomly at the configurable surface for each reference signal, and wherein each reference signal of the set of reference signals has a corresponding reference signal index value

1715

Retransmit each received reference signal of the set of reference signals based at least in part on the corresponding one or more transmission parameters

1720

Receive, from the base station, an indication of a selected reference signal index value for use in subsequent communications between the UE and the base station

BEAMFORMING TECHNIQUES USING RANDOM-BASED PARAMETER SELECTION AT RECONFIGURABLE INTELLIGENT SURFACES

CROSS REFERENCE

The present application is a 371 national stage filing of International PCT Application No. PCT/CN2021/086499 by ELSHAFIE et al. entitled "BEAMFORMING TECH-NIQUES USING RANDOM-BASED PARAMETER SELECTION AT RECONFIGURABLE INTELLIGENT SURFACES," filed Apr. 12, 2021, which is assigned to the assignee hereof, and which is expressly incorporated by reference in its entirety herein.

FIELD OF TECHNOLOGY

The following relates to wireless communications, includ-ing beamforming techniques using random-based parameter selection at reconfigurable intelligent surfaces.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communica-tion for multiple communication devices, which may be otherwise known as user equipment (UE). In some wireless communications systems, a UE may transmit uplink data and control information directly to a base station (e.g., using beamforming). In some cases, however, the path between the UE and the base station may be obstructed or blocked, which may reduce the likelihood that the base station receives an uplink transmission from the UE, that the UE receives an downlink transmission from the base station, or both.

SUMMARY

The described techniques relate to improved methods, systems, devices, and apparatuses that support beamforming techniques using random-based parameter selection at reconfigurable intelligent surfaces (RISs). In various aspects, the described techniques provide for a communi-cation device to support use of one or more RISs, or other reflective surface(s), to enable higher throughput and extended coverage in a wireless communication system. The one or more RISs may be configured in some examples to facilitate uplink communications, downlink communica-tions, or both, and based on a training procedure that identifies reliable transmission parameters for such commu-nications. In some cases, a transmitting device (e.g., a base station or a user equipment (UE)) may transmit a set of reference signals to a receiving device via a RIS, and the RIS may randomly adjust one or more parameters for one or multiple RIS elements to provide different beamformed parameters for reflected instances of each reference signal from the RIS. In some cases, each reference signal has a corresponding reference signal index value, and the receiv-ing device (e.g., a UE or base station) may provide an indication of a selected the reference signal index value based on channel measurements of the reference signals. The transmitting device may provide an indication to the RIS of the index value, and may communicate with the receiving device using transmission parameters that are based on the selected reference signal via the RIS, where the RIS uses the parameters associated with the RIS index value for reflecting transmissions of the transmitting device.

A method for wireless communication at a first device is described. The method may include transmitting a set of reference signals to a second device via a configurable surface that is separate from the first device and the second device, where the configurable surface has a set of multiple configurable surface elements, and one or more transmission parameters of at least a subset of the set of multiple configurable surface elements is selected randomly at the configurable surface for one or more reference signals of the set of reference signals, and where each reference signal of the set of reference signals has a corresponding reference signal index value, receiving, from the second device, a first indication of a first reference signal index value of the set of reference signals based on channel quality measurements of the set of reference signals, and transmitting, using beam-forming that is based on the first indication, a data trans-mission to the second device via the configurable surface.

An apparatus for wireless communication at a first device is described. The apparatus may include a processor, memory coupled with the processor, and instructions stored in the memory. The instructions may be executable by the processor to cause the apparatus to transmit a set of refer-ence signals to a second device via a configurable surface that is separate from the first device and the second device, where the configurable surface has a set of multiple config-urable surface elements, and one or more transmission parameters of at least a subset of the set of multiple configurable surface elements is selected randomly at the configurable surface for one or more reference signals of the set of reference signals, and where each reference signal of the set of reference signals has a corresponding reference signal index value, receive, from the second device, a first indication of a first reference signal index value of the set of reference signals based on channel quality measurements of the set of reference signals, and transmit, using beamform-ing that is based on the first indication, a data transmission to the second device via the configurable surface.

Another apparatus for wireless communication at a first device is described. The apparatus may include means for transmitting a set of reference signals to a second device via a configurable surface that is separate from the first device and the second device, where the configurable surface has a set of multiple configurable surface elements, and one or more transmission parameters of at least a subset of the set of multiple configurable surface elements is selected ran-domly at the configurable surface for one or more reference signals of the set of reference signals, and where each reference signal of the set of reference signals has a corre-sponding reference signal index value, means for receiving, from the second device, a first indication of a first reference signal index value of the set of reference signals based on channel quality measurements of the set of reference signals, and means for transmitting, using beamforming that is based on the first indication, a data transmission to the second device via the configurable surface.

A non-transitory computer-readable medium storing code for wireless communication at a first device is described. The code may include instructions executable by a processor to transmit a set of reference signals to a second device via a configurable surface that is separate from the first device and the second device, where the configurable surface has a set of multiple configurable surface elements, and one or more transmission parameters of at least a subset of the set of multiple configurable surface elements is selected randomly at the configurable surface for one or more reference signals of the set of reference signals, and where each reference signal of the set of reference signals has a corresponding reference signal index value, receive, from the second device, a first indication of a first reference signal index value of the set of reference signals based on channel quality measurements of the set of reference signals, and transmit, using beamforming that is based on the first indication, a data transmission to the second device via the configurable surface.

Some examples of the method, apparatuses, and non-transitory computer-readable medium described herein may further include operations, features, means, or instructions for receiving, from the configurable surface, an indication of a capability to change one or more of a phase of one or more configurable surface elements of the set of multiple configurable surface elements, an amplitude of one or more configurable surface elements of the set of multiple configurable surface elements, or any combinations thereof, and where the set of reference signals is transmitted responsive to the indication. In some examples of the method, apparatuses, and non-transitory computer-readable medium described herein, the indication further provides a resolution and a range of one or more of available phase adjustments, available amplitude adjustments, or any combinations thereof.

Some examples of the method, apparatuses, and non-transitory computer-readable medium described herein may further include operations, features, means, or instructions for transmitting, to the configurable surface, an indication of the first reference signal index value for use in subsequent communications between the first device and the second device, where the configurable surface sets the one or more transmission parameters of the set of multiple configurable surface elements based on the first reference signal index value. In some examples of the method, apparatuses, and non-transitory computer-readable medium described herein, the set of reference signals may be configured to include a quantity of reference signals that is based on a number of different phases available for measurement at the configurable surface, a number of configurable surface elements or subsets of configurable surface elements to be adjusted at the configurable surface, or any combinations thereof. In some examples of the method, apparatuses, and non-transitory computer-readable medium described herein, each reference signal index value corresponds to an index in time that is associated with a corresponding reference signal and a non-codebook beamforming phase set.

In some examples of the method, apparatuses, and non-transitory computer-readable medium described herein, each reference signal of the set of reference signals is associated with a different phase, a different amplitude, or any combinations thereof, for multiple configurable surface elements or groups of configurable surface elements. In some examples of the method, apparatuses, and non-transitory computer-readable medium described herein, the different phases, the different amplitudes, or any combinations thereof, are randomly selected from a defined set of available adjustments.

In some examples of the method, apparatuses, and non-transitory computer-readable medium described herein, the set of reference signals is a first set of reference signals associated with a first training stage for a first transmission parameter of the configurable surface and the method, apparatuses, and non-transitory computer-readable medium may include further operations, features, means, or instructions for transmitting a second set of reference signals associated with a second training stage to the second device via the configurable surface, where a second transmission parameter of at least the subset of the set of multiple configurable surface elements is selected randomly at the configurable surface for one or more reference signals of the second set of reference signals, receiving, from the second device, a second indication of a second reference signal index value of a second reference signal of the second set of reference signals based on channel quality measurements of the second set of reference signals, and determining a beamforming codebook based on the first indication and the second indication.

In some examples of the method, apparatuses, and non-transitory computer-readable medium described herein, the first training stage may be for selection of a phase associated with one or more of the set of multiple configurable surface elements of the configurable surface, the second training stage may be for selection of an amplitude of one or more of the set of multiple configurable surface elements of the configurable surface, and a third training stage may be for joint training of both phase and amplitude of one or more of the set of multiple configurable surface elements of the configurable surface. In some examples of the method, apparatuses, and non-transitory computer-readable medium described herein, the first training stage and the second training stage may be configured by radio resource control (RRC) signaling, by downlink control information (DCI), or any combinations thereof. In some examples of the method, apparatuses, and non-transitory computer-readable medium described herein, each training stage may have an independently configurable quantity of reference signals in the associated set of reference signals.

A method for wireless communication at a configurable surface is described. The method may include transmitting, to a base station, a capability indication of a capability to change one or more of a phase of one or more configurable surface elements of a set of multiple configurable surface elements at the configurable surface, an amplitude of one or more configurable surface elements of the set of multiple configurable surface elements, or any combinations thereof, receiving, from the base station, configuration information for a beam training procedure that indicates a set of reference signals to be transmitted between the base station and a user equipment (UE) via the configurable surface, setting one or more transmission parameters of at least a subset of the set of multiple configurable surface elements for each reference signal of the set of reference signals, where the one or more transmission parameters is selected randomly at the configurable surface for each reference signal, and where each reference signal of the set of reference signals has a corresponding reference signal index value, retransmitting each received reference signal of the set of reference signals based on the corresponding one or more transmission parameters, and receiving, from the base station, an indication of a selected reference signal index value for use in subsequent communications between the UE and the base station.

An apparatus for wireless communication at a configurable surface is described. The apparatus may include a processor, memory coupled with the processor, and instructions stored in the memory. The instructions may be executable by the processor to cause the apparatus to transmit, to a base station, a capability indication of a capability to change one or more of a phase of one or more configurable surface elements of a set of multiple configurable surface elements at the configurable surface, an amplitude of one or more configurable surface elements of the set of multiple configurable surface elements, or any combinations thereof, receive, from the base station, configuration information for a beam training procedure that indicates a set of reference signals to be transmitted between the base station and a UE via the configurable surface, set one or more transmission parameters of at least a subset of the set of multiple configurable surface elements for each reference signal of the set of reference signals, where the one or more transmission parameters is selected randomly at the configurable surface for each reference signal, and where each reference signal of the set of reference signals has a corresponding reference signal index value, retransmit each received reference signal of the set of reference signals based on the corresponding one or more transmission parameters, and receive, from the base station, an indication of a selected reference signal index value for use in subsequent communications between the UE and the base station.

Another apparatus for wireless communication at a configurable surface is described. The apparatus may include means for transmitting, to a base station, a capability indication of a capability to change one or more of a phase of one or more configurable surface elements of a set of multiple configurable surface elements at the configurable surface, an amplitude of one or more configurable surface elements of the set of multiple configurable surface elements, or any combinations thereof, means for receiving, from the base station, configuration information for a beam training procedure that indicates a set of reference signals to be transmitted between the base station and a UE via the configurable surface, means for setting one or more transmission parameters of at least a subset of the set of multiple configurable surface elements for each reference signal of the set of reference signals, where the one or more transmission parameters is selected randomly at the configurable surface for each reference signal, and where each reference signal of the set of reference signals has a corresponding reference signal index value, means for retransmitting each received reference signal of the set of reference signals based on the corresponding one or more transmission parameters, and means for receiving, from the base station, an indication of a selected reference signal index value for use in subsequent communications between the UE and the base station.

A non-transitory computer-readable medium storing code for wireless communication at a configurable surface is described. The code may include instructions executable by a processor to transmit, to a base station, a capability indication of a capability to change one or more of a phase of one or more configurable surface elements of a set of multiple configurable surface elements at the configurable surface, an amplitude of one or more configurable surface elements of the set of multiple configurable surface elements, or any combinations thereof, receive, from the base station, configuration information for a beam training procedure that indicates a set of reference signals to be transmitted between the base station and a UE via the configurable surface, set one or more transmission parameters of at least a subset of the set of multiple configurable surface elements for each reference signal of the set of reference signals, where the one or more transmission parameters is selected randomly at the configurable surface for each reference signal, and where each reference signal of the set of reference signals has a corresponding reference signal index value, retransmit each received reference signal of the set of reference signals based on the corresponding one or more transmission parameters, and receive, from the base station, an indication of a selected reference signal index value for use in subsequent communications between the UE and the base station.

In some examples of the method, apparatuses, and non-transitory computer-readable medium described herein, a quantity of reference signals in the set of reference signals may be based on a number of different phases available for measurement at the configurable surface, a number of configurable surface elements or subsets of configurable surface elements to be adjusted at the configurable surface, or any combinations thereof. In some examples of the method, apparatuses, and non-transitory computer-readable medium described herein, the capability indication further provides a resolution and a range of one or more of available phase adjustments, available amplitude adjustments, or any combinations thereof.

In some examples of the method, apparatuses, and non-transitory computer-readable medium described herein, each reference signal index value corresponds to an index in time that may be associated with a corresponding set of transmission parameters of the set of multiple configurable surface elements. In some examples of the method, apparatuses, and non-transitory computer-readable medium described herein, each reference signal of the set of reference signals may be associated with a different phase, a different amplitude, or any combinations thereof, for multiple configurable surface elements or groups of configurable surface elements at the configurable surface. In some examples of the method, apparatuses, and non-transitory computer-readable medium described herein, the different phases, the different amplitudes, or any combinations thereof, are randomly selected from a defined set of available adjustments.

In some examples of the method, apparatuses, and non-transitory computer-readable medium described herein, the configuration information for the beam training procedure provides two or more sets of reference signals for two or more stages of training of the configurable surface. In some examples of the method, apparatuses, and non-transitory computer-readable medium described herein, a first training stage may be for phase training of the configurable surface, a second training stage may be for amplitude training of the configurable surface, and a third training stage may be for joint training of both phase and amplitude of the configurable surface. In some examples of the method, apparatuses, and non-transitory computer-readable medium described herein, the configuration information for the beam training procedure may be received in one or more of RRC signaling, DCI, or any combinations thereof. In some examples of the method, apparatuses, and non-transitory computer-readable medium described herein, each stage of the two or more stages of training may have an independently configurable quantity of reference signals in an associated set of reference signals.

BRIEF DESCRIPTION OF THE DRAWINGS

FIGS. 14 through 17 show flowcharts illustrating methods that support beamforming techniques using random-based parameter selection at RISs in accordance with aspects of the present disclosure.

DETAILED DESCRIPTION

Figure 1:
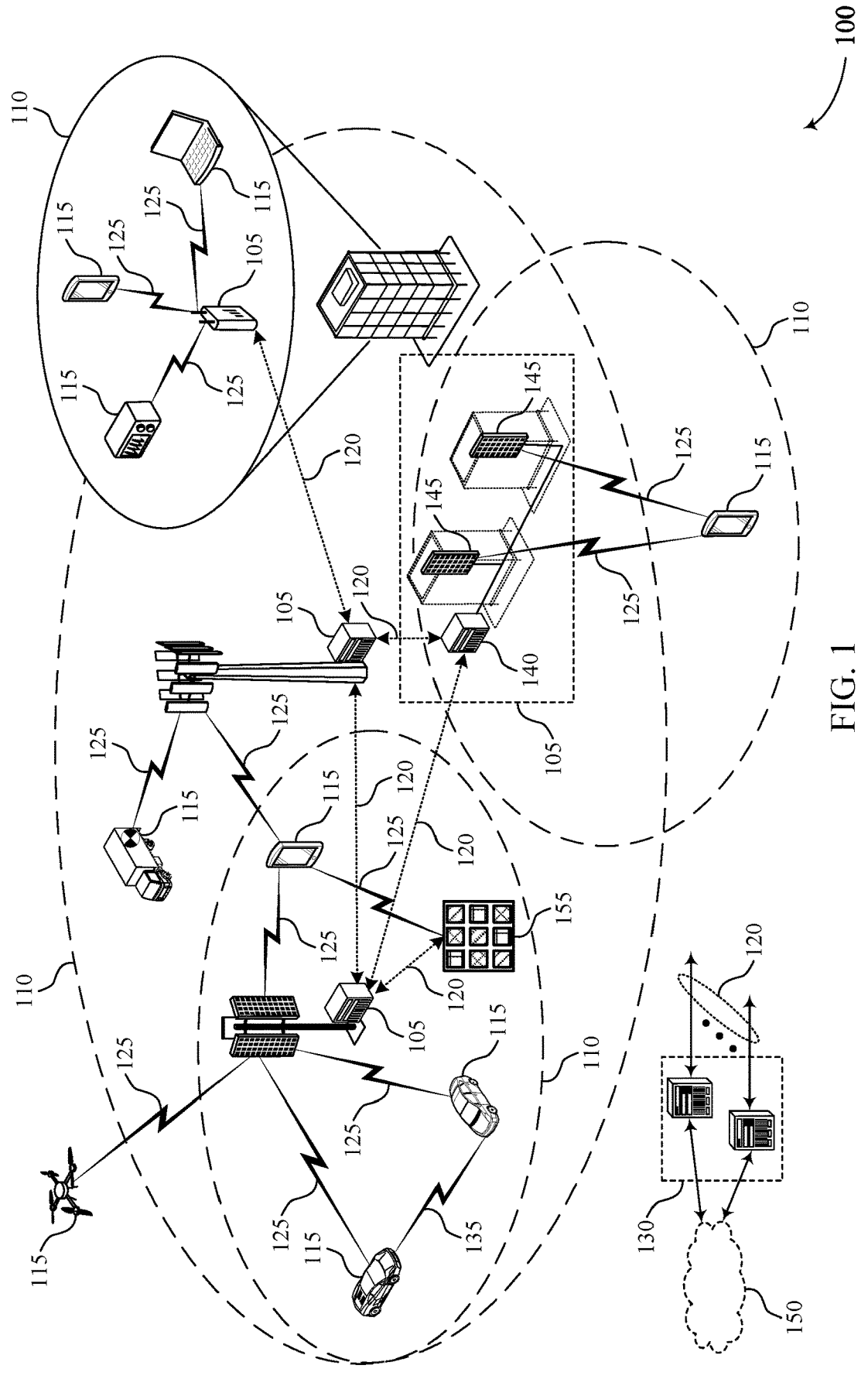
FIG. 1 illustrates an example of a wireless communications system that supports beamforming techniques using random-based parameter selection at reconfigurable intelligent surfaces (RISs) in accordance with aspects of the present disclosure.

In some wireless communications systems (e.g., systems implementing a massive multiple input-multiple output (MIMO) communication scheme), wireless devices may implement spatial division multiple access (SDMA) to increase signaling throughput. For example, a base station may use beamforming techniques to communicate with multiple user equipment (UE) devices concurrently by using spatial dimensions provided by an environment. However, in some cases, physical proximity or environmental factors (e.g., interference, blockage) may impair beamforming communications between the base station and the multiple UEs. In some cases, to overcome such impairments, the base station may employ an active antenna unit (AAU) to act as a relay between the base station and the multiple UEs. The AAU may include one or more antenna ports, radio frequency (RF) chains, and power amplifiers. The AAU may allow the base station to increase spatial diversity, beamforming gain, and cell coverage. For example, the AAU may receive a beamformed communication from the base station, amplify the beamformed communication, and re-transmit the beamformed communication to a UE. As such, in comparison to receiving the beamformed communication directly from the base station, the UE may have a higher likelihood of successfully receiving the beamformed communication via the AAU. However, active components (e.g., RF chains, power amplifiers) used by the AAU to amplify signals may be associated with increased power consumption. For example, a power amplifier at the AAU may utilize a significant power overhead to amplify and re-transmit a received signal. Such power overhead may be undesirable and inefficient in some systems.

In some examples, the base station may employ a reconfigurable intelligent surface (RIS) (e.g., a reconfigurable reflective surface) that uses passive components (e.g., capacitors, resistors) to reflect incoming signals in one or more directions with a reduced power overhead. For example, the RIS may be a passive or near passive device that may use a capacitor and a resistor associated with a RIS element (e.g., a patch element, coupled with a tunable resistor and capacitor, sitting on a ground plane, which may be referred to as an antenna element or a configurable surface element herein) to reflect a signal in a specific direction (e.g., instead of using a power amplifier to amplify and re-transmit the signal). An array of RIS elements on the RIS may thus be configured to increase cell coverage, spatial diversity, and beamforming gain while consuming less power than an AAU. An RIS may also be referred to as an intelligent reflecting surface (IRS) or large intelligent surfaces (LIS), and techniques as discussed herein are applicable to any various types of passive or near-passive surfaces that provide reflection of signals via multiple elements. In some cases, the base station may dynamically configure the RIS to reflect an incoming signal in a specific direction. For example, the base station may configure the RIS to reflect a beamformed communication in a direction of a UE based on a location of the UE. Similarly, the UE may transmit a beamformed communication in a direction of the RIS based on a base station configuration or a UE selection. To effectively implement the RIS, the base station may indicate configuration information for the RIS to the UE. The configuration information may include a location of the RIS, an uplink reflection angle of the RIS, a downlink reflection angle of the RIS, or a combination thereof. In some examples, the base station may transmit, to the UE (e.g., via a RIS), configuration information for multiple RISs in a coverage area of the base station. The UE may select one of the multiple RISs to facilitate communication with the base station based on the configuration information for the multiple RISs. In some aspects, the UE may transmit, to the base station, feedback indicating the selected RIS.

As part of a configuration or reconfiguration procedure between the UE and the base station, a training procedure to identify RIS parameters (e.g., phase and amplitude parameters) may be performed, which uses multiple reference signal transmissions between the UE and base station via the RIS. Measurements of the reference signals may be used to identify RIS parameters for the RIS elements, and to identify a preferred beamforming or preferred precoding at the UE and base station determined based on the training procedure. In some cases, the RIS may have a relatively large number of RIS elements, and such a training procedure may involve a relatively large number of reference signals, which can consume relatively large amounts of overhead. Further, procedures that step through an ordered sequence of parameter adjustments may potentially result in identification of local minima or maxima of a channel metric being selected for communications.

In accordance with various aspects as discussed herein, techniques are provided for efficient training procedures that identify favorable beamforming and RIS settings while using relatively few reference signals. In some cases, a transmitting device (e.g., a base station or a UE) may transmit a set of reference signals (e.g., K reference signals, where K may be based on a number of different phases available for measurement at the RIS, a number of RIS elements or subsets of RIS elements to be adjusted at the RIS, or any combinations thereof) to a receiving device (e.g., a UE or base station) via a RIS, and the RIS may randomly adjust one or more parameters for one or multiple RIS elements to provide different beamformed parameters for reflected instances of each reference signal from the RIS. In some cases, each reference signal has a corresponding reference signal index value, and the receiving device may provide an indication of a selected the reference signal index value based on channel measurements of the reference signals. The transmitting device may provide an indication to the MS of the index value, and may communicate with the receiving device using transmission parameters that are based on the selected reference signal via the RIS, where the MS uses the parameters associated with the MS index value for reflecting transmissions of the transmitting device.

In some cases, the RIS may include a controller that manages setting parameters for the RIS elements (e.g., that sets resistance and capacitance values for each RIS element), and such a RIS controller may provide (e.g., to a base station or UE) an indication of a capability to change one or more of a phase of one or more RIS elements (e.g., by adjusting a capacitance associated with a patch element), an amplitude (e.g., by adjusting a resistance associated with a patch element), or any combinations thereof. Based on the capability indication provided by the RIS, the base station or UE may enable RIS training using randomly selected beamforming parameters for a set of reference signals. In some cases, the base station or UE may configure the set of reference signals to include a quantity of reference signals that is based on a number of different phases available for measurement at the RIS, a number of configurable surface elements or subsets of configurable surface elements to be adjusted at the RIS, or any combinations thereof. Further, in some cases, multiple stages of training may be performed, such as a first stage for phase training, a second stage for amplitude training, a third stage for joint amplitude and phase training, and the like, where parameters for RIS elements may be selected randomly in each stage. In further examples, further training phases may be performed based on identified reference signal indices in order to further tune the RIS (e.g., a training procedure that transmits a sequence of reference signals that are identified based on the selected reference signal index an earlier training stage to further refine RIS element parameters).

Particular aspects of the subject matter described herein may be implemented to realize one or more advantages. The described techniques may support improvements in communications between a UE and base station using a RIS by improving reliability and data throughput, and decreasing latency, among other advantages. As such, supported techniques may include improved network operations and, in some examples, may promote network efficiencies, among other benefits.

Aspects of the disclosure are initially described in the context of wireless communications systems. Aspects of the disclosure are further illustrated by and described with reference to process flows, apparatus diagrams, system diagrams, and flowcharts that relate to beamforming techniques using random-based parameter selection at RISs.

FIG. 1 illustrates an example of a wireless communications system 100 that supports beamforming techniques using random-based parameter selection at RISs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A RIS 155 may be a near passive device that reflects incoming signals in a specific direction according to a configuration of the RIS 155. In some examples, the configuration of the RIS 155 may be preconfigured, statically or semi-statically configured, or configured by a network (e.g., configured by the base station 105). In various aspects of the present disclosure, the RIS 155 may be configured based on one or more training procedures that identify parameters for the RIS 155. For example, the RIS 155 may indicate a capability for random-based parameter selection to a base station 105. The base station 105 may configure a training procedure in which a set of reference signals are transmitted between the base station 105 and a UE 115 via the RIS 155, where the RIS randomly selects adjustments to one or more RIS elements (e.g., one or more subsets of RIS elements, one or more rows or columns of RIS elements, individual RIS elements, etc.) for each reference signal transmission. Beamforming parameters at the base station 105 and UE 115 may be set based on a selected reference signal from channel measurements for the set of reference signals, and the RIS 155 may be configured to use the selected adjustments that correspond to the selected reference signal. The RIS 155 may include a processing component (e.g., one or more processors, RIS controller, etc.) that may determine a configuration for the RIS 155 (e.g., based on the message from the base station 105) and may adjust one or more parameters of the RIS 155 to support the training procedure and RIS configuration. In some cases, the RIS 155 may have a wired connection, such as a backhaul link 120, or a wireless connection, such as a communication link 125, with the base station 105.

Figure 2:
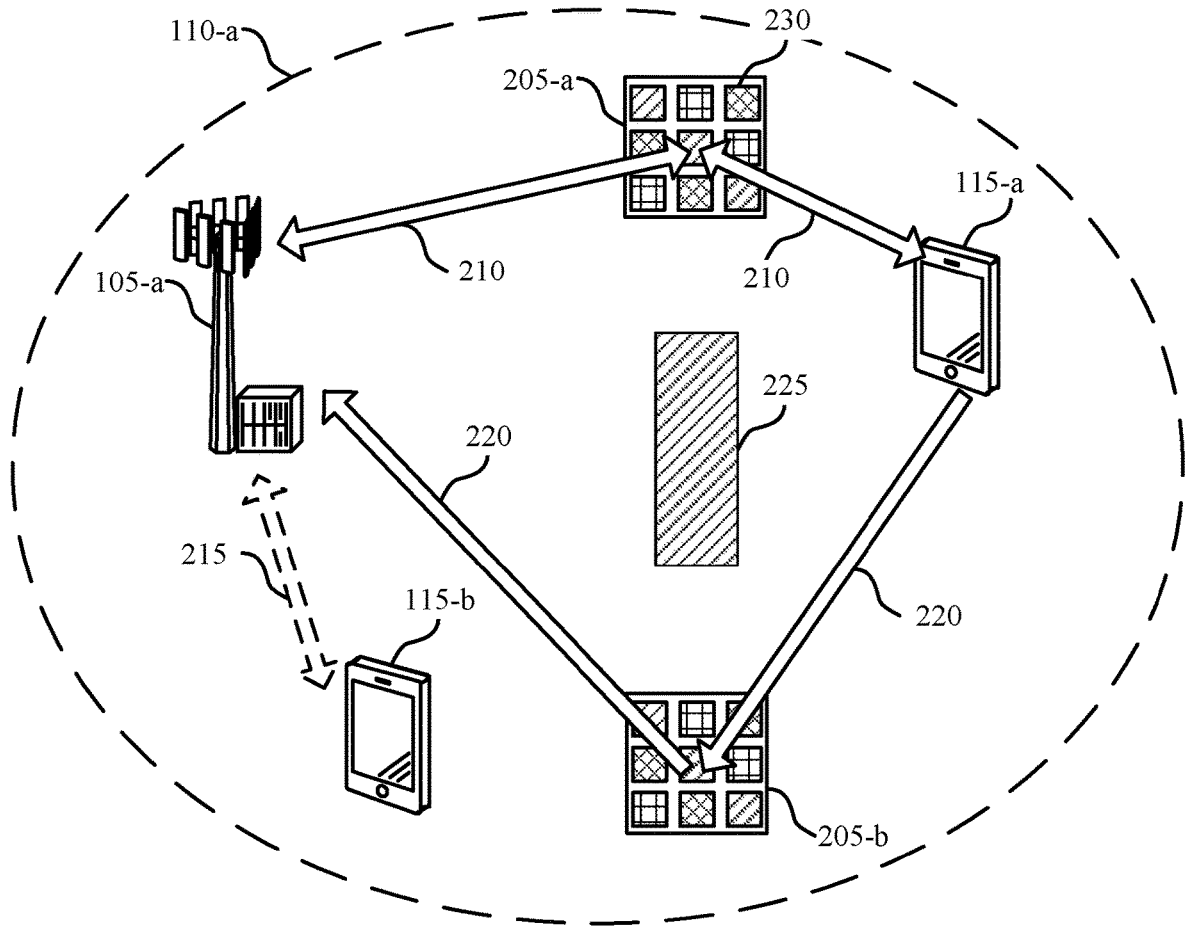
FIG. 2 illustrates an example of a portion of a wireless communications system that supports beamforming techniques using random-based parameter selection at RISs in accordance with aspects of the present disclosure.

FIG. 2 illustrates an example of a wireless communications system 200 that supports beamforming techniques using random-based parameter selection at RISs in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-*a*, a UE 115-*b*, and a base station 105-*a* within a geographic coverage area 110-*a*. The base station 105 and the UEs 115 may be examples of corresponding devices described herein with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may also support improvements to power consumption, spectral efficiency, higher data rates and, in some examples, may promote enhanced efficiency for higher reliability and lower latency wireless communications (e.g., uplink transmissions), among other benefits.

In the example of FIG. 2, the base station 105-*a* and one or more of the UE 115-*a* and the UE 115-*b* may perform wireless communications using one or more RISs 205, which may facilitate the wireless communications between the base station 105-*a* and the one or more of the UE 115-*a* and the UE 115-*b*. In some examples, the UE 115-*a* and the base station 105-*a* may communicate within the geographic coverage area 110-*a* of the base station 105-*a* via a communications link 210. For example, the base station 105-*a* may configure the UE 115-*a* according to a first transmission configuration indication (TCI) state supportive of indirect communication of downlink channel transmissions (e.g., PDCCH, PDSCH transmissions) and downlink reference signals (e.g., CSI-RSs) and uplink channel transmissions (e.g., PUCCH, PUSCH transmissions) and uplink reference signals (e.g., SRS) from and to the base station 105-*a*. The communications link 210 may be a RIS-based communications link and the UE 115-*a* and the base station 105-*a* may use a RIS 205-*a* to communicate via the communications link 210. In some cases, the UE 115-*a* and the base station 105-*a* may use multiple RISs 205 to communicate and a second communications link 220 may be configured according to a second TCI state supportive of indirect communication of, for example, uplink channel transmissions (e.g., PUCCH, PUSCH) and uplink reference signals (e.g., CSI-RSs) to the base station 105-*a*. The communications link 220 may be a RIS-based communications link using RIS 205-*b*.

In some other examples, the UE 115-*b* and the base station 105-*a* may communicate within the geographic coverage area 110-*a* of the base station 105-*a* via a communications link 215. For example, the base station 105-*a* may configure the UE 115-*b* according to a third TCI state supportive of direct communication of downlink and uplink channel transmissions and downlink and uplink reference signals. The communications link 215 may be a non MS-based communications link. That is, the UE 115-*b* and the base station 105-*a* may communicate independent of the RISs 205.

In the wireless communications system 200, the RISs 205 may be a near passive devices that reflect incoming signals in a specific direction according to a configuration of the RIS 205. In some examples, the configuration of the RISs 205 may be determined based on a training procedure to identify RIS parameters (e.g., phase and amplitude parameters) that uses multiple reference signal transmissions between the UE 115-*a* and base station 105-*a* via the RISs 205. For example, for the communications link 210, the base station 105-*a* may transmit a series of reference signals to the UE 115-*a* via the RIS 205-*a*. Measurements of the reference signals may be used to identify parameters for RIS elements 230, and to identify a preferred beamforming at the UE 115-*a* and base station 105-*a* determined based on the training procedure. Training procedure of various aspects will be discussed in more detail with reference to FIGS. 3 through 5.

One or more of the RISs 205, such as RIS 205-*a*, may include a controller (e.g., one or more processors with associated memory) that may determine a configuration for the RIS 205-*a*, such as based on a message from the base station 105-*a* (e.g., a RRC message, downlink control information (DCI), a medium access control (MAC) control element (CE) message, a message provided via a separate link between the RIS 205-*a* and base station 105-*a*, and the like) upon completion of the training procedure, or based on a predetermined or fixed configuration for an RIS 205-*a* that does not have the capability to adjust RIS parameters as part of a training procedure as discussed herein. Based on the configuration, the RIS 205-*a* may adjust one or more parameters to support the configuration. For example, the RIS 205-*a* may use one or more capacitors, resistors, and other passive components to reflect signals between the base station 105-*a* and the UE 115-*a* (e.g., rather than using active components to amplify and re-transmit the signals). The RIS 205-*a* may adjust the capacitors, resistors, or combination thereof to support a specific configuration for one or more RIS elements 230 (e.g., based on a configuration message from the base station 105-*a*). The RISs 205 may have a wired connection or a wireless connection with the base station 105-*a*.

In some aspects, using one or more RISs 205 may extend the coverage area 110-*a* of the base station 105-*a* and enable higher throughput in the wireless communications system 200. In some other aspects, using one or more RISs 205 may provide for communications between the base station 105-*a* and the UE 115-*a* under conditions in which direct communications may be unreliable. For example, interference resulting from physical proximity or environmental factors, such as a blockage 225, may be avoided or mitigated by communicating via one or more of the RISs 205. In some examples, the base station 105-*a* may transmit, to the UE 115-*a*, an indication of a configuration of a set of multiple RISs 205 (e.g., via an RRC message, DCI, MAC-CE, etc.). In some examples, the configuration message may indicate, to the UE 115-*a*, configuration information for one or more RISs 205 in the wireless communications system 200.

Figure 3:
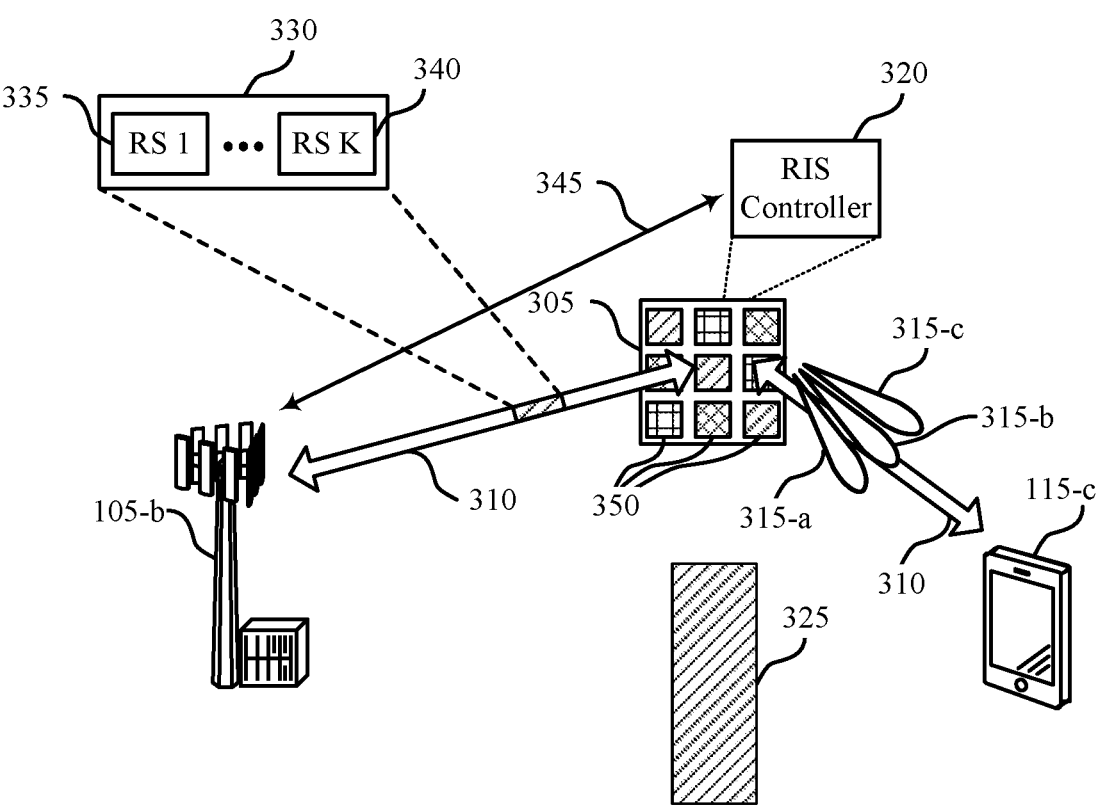
FIGS. 3 and 4 illustrate examples of sets of reference signals transmitted via a MS that supports beamforming techniques using random-based parameter selection at RISs in accordance with aspects of the present disclosure.

FIG. 3 illustrates an example of a set of reference signals transmitted via a RIS in a wireless communications system 300 that supports beamforming techniques using random-based parameter selection at RISs in accordance with aspects of the present disclosure. In some examples, the wireless communications system 300 may implement aspects of the wireless communications systems 100 or 200 or may be implemented by aspects of the wireless communications systems 100 or 200. For example, the wireless communications system 300 may include a UE 115-*c* and a base station 105-*b*. The base station 105-*b* and the UE 115-*c* may be examples of corresponding devices described herein. In some examples, the wireless communications system 300 may support multiple radio access technologies including 4G systems such as LTE systems, LTE-A systems, or LTE-A Pro systems, and 5G systems which may be referred to as NR systems. The wireless communications system 300 may also support improvements to power consumption, spectral efficiency, higher data rates and, in some examples, may promote enhanced efficiency for higher reliability and lower latency wireless communications (e.g., uplink transmissions), among other benefits.

In the example of FIG. 3, the base station 105-*b* and the UE 115-*c* may perform wireless communications using RIS 305, which may facilitate the wireless communications between the base station 105-*b* and the UE 115-*c* (and in some cases one or more other UEs). In some examples, the UE 115-*c* and the base station 105-*b* may communicate via the RIS 305 on communications link 310 to provide enhanced communication in the presence of obstruction 325. In accordance with various aspects as discussed herein, techniques are provided for efficient training procedures that identify favorable beamforming and MS settings while using relatively few reference signals. In some cases, the base station 105-*b* may transmit a set of reference signals 330 (e.g., RS-1 335 through RS-K 340, where the number of reference signals may be based on a size of the array of RIS elements) to the UE 115-*c* via the MS 305. In some cases, the RIS 305 may randomly adjust one or more parameters for one or multiple RIS elements 350 to provide different beamformed parameters for reflected instances of each reference signal from the RIS 305. For example, for a first reference signal of the set of reference signals 330 (e.g., RS-1 335), the RIS 305 may adjust one or more RIS elements 350, such as a subset of sub-array of elements on the RIS 305, using one or more parameters that are randomly selected from a group of available parameters.

In some cases, an RIS controller 320 (which may be an example of a communications manager 1020, 1120, 1220, or 1320 as discussed with reference to FIGS. 10 through 13) may provide an indication to the base station 105-*a* that the RIS 305 is capable of performing a training procedure based on randomly selected parameters. In some cases, the indication may be provided via communications link 345 that may be a wired or wireless link between the base station 105-*b* and RIS 305 using any suitable communications protocol. In some cases, the RIS controller 320 may provide an indication of a capability of the RIS 305 to change phases and amplitudes of RIS elements 350. In some cases, the RIS controller 320 may provide an indication of a resolution and range of each parameter that can be adjusted. For example, the RIS controller 320 may provide an indication that the RIS 305 can change phase values of each RIS element 350 from $\varphi_1$ to $\varphi_2$ with a step size of $\Delta_{100}$. In some cases, the RIS controller 320 may also provide an indication that the RIS 305 can change amplitude values of each RIS element from $a_1$ to $a_2$ with a step size of $\Delta_a$. In some cases, the capability indication may provide an indication of phase-only, or phase plus amplitude.

Based on the capability indication, the base station 105-*b* in this example, may provide an indication that a training procedure is to be initiated to the RIS 305 and the UE 115-*c*. In some cases, the base station 105-*b* may provide a timing for the training procedure, information that indicates the set of reference signals 330, one or more TCI states that are associated with one or more reference signals of the set of reference signals 330, or any combinations thereof. In some cases, each reference signal of the set of reference signals 330 may have an associated reference signal index value (e.g., K different indices, where each index is a matrix of size N by M (N rows and M columns) corresponding to the array of MS elements 350), and the UE 115-*c* may perform measurements and the MS 305 may perform parameter adjustments that are associated with each index value.

In some cases, the RIS controller 320 may generate random phases for each RIS element 350 (e.g., corresponding to reflected beams 315-*a*, 315-*b*, 315-*c*, etc.). In some cases, these random phases may be uniform (e.g., a uniform adjustment between each reference signal), or from a defined set (e.g., a defined set of available adjustments from which the phases may be selected at random), or uniform within a range of phases (e.g., within a range [$\varphi_{min}$ and $\varphi_{max}$]). As the base station 105-*b* transmit the sequence of K reference signals of the set of reference signals 330 (e.g., where K may be RRC, MAC-CE, or DCI configured), the RIS 305 makes the parameter adjustments and the UE 115-*c* performs one or more channel measurements. In some cases, the RIS 305 uses a different non-codebook precoder for each reference signals occasion or transmission. The UE 115-*c*, may transmit an indication of a selected reference signal index to the base station 105-*b*, where the index in time represents the best measured reference signal (e.g., a reference signal with a highest measured reference signal received power (RSRP), reference signal received quality (RSRQ), received signal strength index (RSSI), etc.), and thus represents a selected non-codebook phase set.

As discussed herein, in some cases the RIS 305 may also provide for amplitude adjustments at RIS elements 350. In some cases, the RIS controller 320 may provide a change in amplitude values of each RIS element 350 from $a_1$ to $a_2$, based on RIS implementations, and the RIS 305 can change amplitude for each RIS element 350 or a cluster of RIS elements 350 in addition to the phase adjustments. In some cases, the ranges of parameter adjustments may be set based on one or more characteristics of the RIS 305. For example, a range of [$\varphi_{min}$ and $\varphi_{max}$] and [$a_{min}$ and $a_{max}$] may be defined and may change based on, for example, a node that is receiving communications and/or a node that is transmitting communications (e.g., based on a RIS 305 location, uplink MS reflection angles, downlink MS reflection angles, reciprocal MS reflection angles, or any combinations thereof), a priority of transmissions (e.g., URLLC or enhanced mobile broadband (eMBB) communications, which may have different latency and reliability targets), or any combinations thereof.

In some cases, where the MS 305 is capable of both phase and amplitude adjustments, multiple stages of training may be implemented. For example, a three stage training procedure may include a phase training stage, an amplitude training stage, and a joint training stage. In some cases, the stages of training may be enabled by the base station 105-*b* (e.g., by RRC, DCI, or MAC-CE indication) at the RIS controller 320 and the UE 115-*c*. In such cases, the UE 115-*c* may provide a selected index value of reference signals that are transmitted in each training stage. In some cases, for a first stage, the RIS controller 320 may fix the amplitude of each RIS element 350 and change the phase only within [$\varphi_{min}$ and $\varphi_{max}$]. The UE 115-*c* may then provide an indication of one or more selected index values of reference signals with the best channel measurements, which may be provided to the RIS controller 320 (e.g., via the base station 105-*b*). In the second stage, the RIS controller 320, based at least in part on the phases provided from the first stage, may fix the phase for one or more set phase values and change the phase only within [$a_{min}$ and $a_{max}$]. The UE 115-*c* may again provide an indication of one or more selected index values of reference signals with the best channel measurements, which may be provided to the RIS controller 320. In the third stage, the RIS controller 320 may sweep phases and amplitude together within the best values obtained from the previous two stages. In some cases, each stage may have a different number of reference signals (e.g., based on values of K1, K2, K3) that may be configured by the base station 105-*b* (e.g., via RRC, MAC-CE, or DCI signaling).

After completion of the training procedure(s), the UE 115-*c* and base station 105-*b* may communicate using communications link 310 that is reflected by the RIS 305. In some cases, by performing random selection of parameters at the RIS 305, the set of reference signals 330 may have a reduced number of reference signals relative to techniques that perform measurements based on different permutations of the number of RIS elements 350. Further, such techniques may test different candidate MS precoders and may provide confirmation that a particular precoder does in fact provide a more favorable beam, which may help avoid a training procedure that converges on a local minima or local maxima. While the example of FIG. 3 illustrates the base station 105-*b* transmitting the set of reference signals 330, in other cases the UE 115-*c* may transmit a set of reference signals for training of the MS 305 for uplink communications, an example of which is discussed with reference to FIG. 4.

Figure 4:
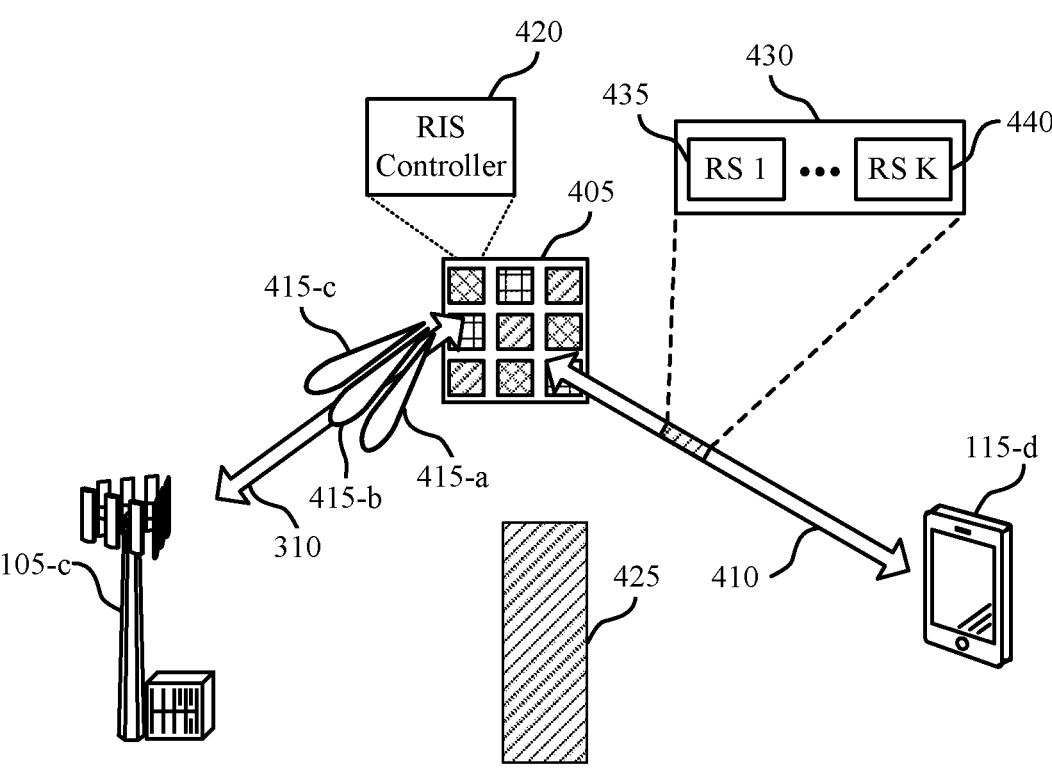

FIG. 4 illustrates an example of a set of reference signals transmitted via a MS in a wireless communications system 400 that supports beamforming techniques using random-based parameter selection at RISs in accordance with aspects of the present disclosure. In some examples, the wireless communications system 400 may implement aspects of the wireless communications systems 100, 200, or 300 or may be implemented by aspects of the wireless communications systems 100, 200, or 300. For example, the wireless communications system 400 may include a UE 115-*d* and a base station 105-*c*. The base station 105-*c* and the UE 115-*d* may be examples of corresponding devices described herein. In some examples, the wireless communications system 400 may support multiple radio access technologies including 4G systems such as LTE systems, LTE-A systems, or LTE-A Pro systems, and 5G systems which may be referred to as NR systems. The wireless communications system 400 may also support improvements to power consumption, spectral efficiency, higher data rates and, in some examples, may promote enhanced efficiency for higher reliability and lower latency wireless communications (e.g., uplink transmissions), among other benefits.

In the example of FIG. 4, similarly as in the example of FIG. 3, the base station 105-*c* and the UE 115-*d* may perform wireless communications using MS 405, which may facilitate the wireless communications between the base station 105-*c* and the UE 115-*d* (and in some cases one or more other UEs). In this example, the UE 115-*d* may transmit a set of reference signals 430, including RS-1 435 through RS-K 440 via the RIS 405 that may be measured at the base station 105-*c* to determine transmission parameters for communications link 410, which may provide enhanced communication in the presence of obstruction 425. In some cases, the base station 105-*c* may configure the set of reference signals 430 at the UE 115-*d* and MS 405 (e.g., via RRC, MAC-CE, or DCI). In some cases, the MS 405 may randomly adjust one or more parameters for one or multiple MS elements to provide different beamformed parameters for reflected instances of each reference signal from the MS 405. For example, for a first reference signal of the set of reference signals 430 (e.g., RS-1 435), the MS 405 may adjust one or more RIS elements, such as a subset of sub-array of elements on the MS 405, using one or more parameters that are randomly selected from a group of available parameters.

In some cases, an RIS controller 420 (which may be an example of a communications manager 1020, 1120, 1220, or 1320 as discussed with reference to FIGS. 10 through 13) may provide the indication to the base station 105-*a* that the MS 405 is capable of performing a training procedure based on randomly selected parameters (e.g., via communications link 345 as illustrated in FIG. 3). In some cases, the RIS controller 420 may provide an indication of a capability of the RIS 405 to change phases, or both phases and amplitudes, of RIS elements as discussed herein. Based on the configuration provided by the base station 105-*c*, the UE 115-*d* and RIS 405 may initial the training procedure in order to identify the reference signal index that has measurements that indicate that beamforming (e.g., based on a precoding matrix index associated with the reference signal) associated with the reference signal index are to be used for communications. As discussed herein, in some cases the RIS controller 420 may generate random phases for each RIS element 450 (e.g., corresponding to reflected beams 415-*a*, 415-*b*, 415-*c*, etc.), where the random phases may be uniform (e.g., a uniform adjustment between each reference signal), or from a defined set (e.g., a defined set of available adjustments from which the phases may be selected at random), or uniform within a range of phases (e.g., within a range [$\varphi_{min}$ and $\varphi_{max}$]). Further, in cases where amplitude may be adjusted, corresponding adjustments associated with amplitude may be generated.

In some cases, where the MS 405 is capable of both phase and amplitude adjustments, multiple stages of training may be implemented, such as a three stage training procedure as discussed with reference to FIG. 3, in which the UE 115-*d* is configured to transmit the multiple sets of reference signals 430 for measurement by the base station 105-*c*. After completion of the training procedure(s), the UE 115-*d* and base station 105-*c* may communicate using communications link 410 that is reflected by the RIS 405. In some cases, by performing random selection of parameters at the MS 405, the set of reference signals 430 may have a reduced number of reference signals relative to techniques that perform measurements based on different permutations of the number of MS elements. In some cases, uplink and downlink communications may be transmitted using communications links that are reflected off of different RISs, where training procedures as discussed herein are performed for each MS.

Figure 5:
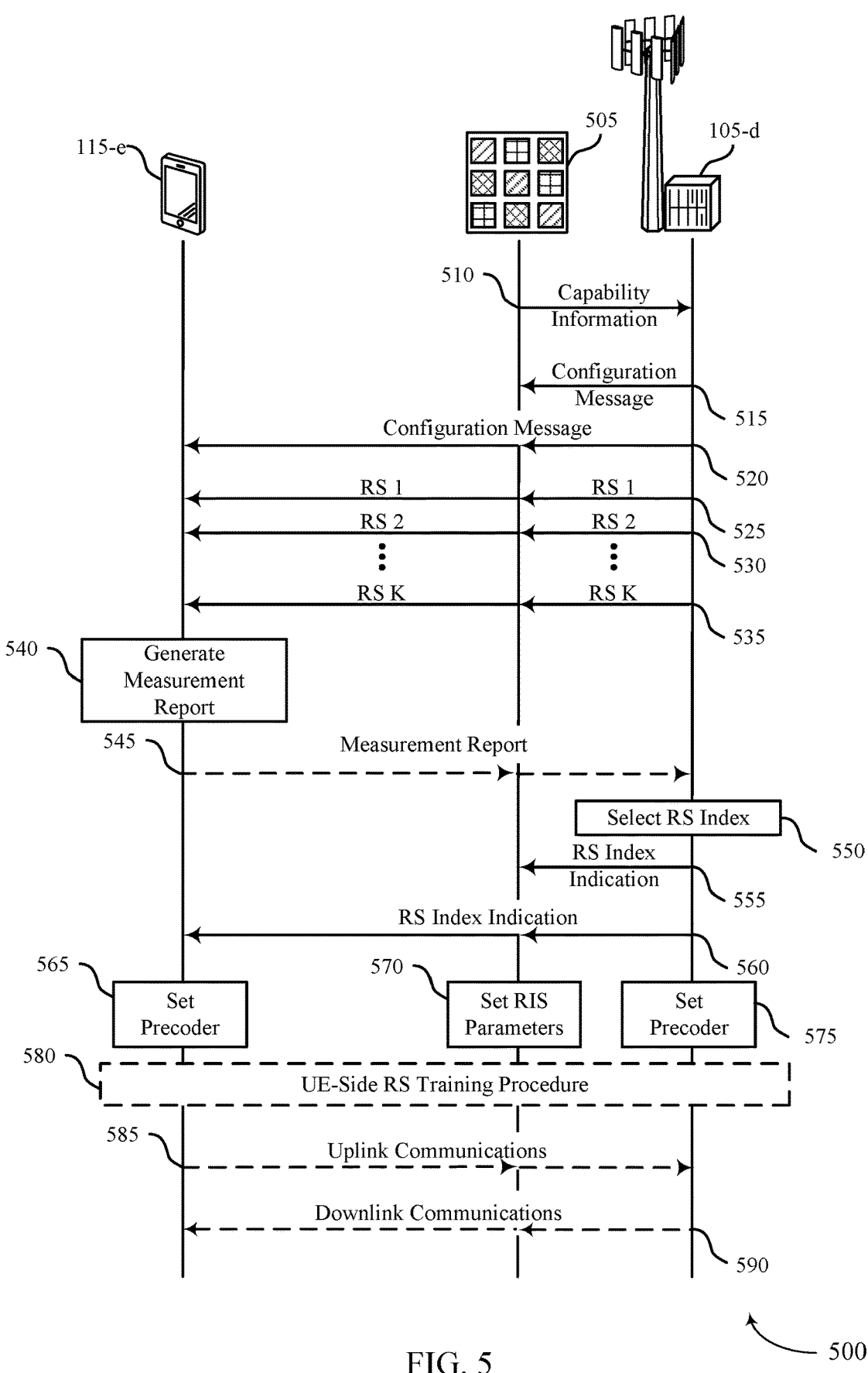
FIG. 5 illustrates an example of a process flow that supports beamforming techniques using random-based parameter selection at RISs in accordance with aspects of the present disclosure.

FIG. 5 illustrates an example of a process flow 500 that supports beamforming techniques using random-based parameter selection at RISs in accordance with aspects of the present disclosure. The process flow 500 may implement aspects of the wireless communications systems 100, 200, 300, and 400, or may be implemented by aspects of the wireless communications system 100, 200, 300, and 400. For example, the process flow 500 may be based on a configuration by a base station 105-*d*, which may be implemented by the base station 105-*d*, a UE 115-*e*, and RIS 505. The base station 105-*d* and the UE 115-*e* may be examples of a base station 105 and a UE 115, as described with reference to FIGS. 1 through 4. In the following description of the process flow 500, the operations between the base station 105-*d*, the UE 115-*e*, and the RIS 505 may be transmitted in a different order than the example order shown, or the operations performed by the base station 105-*d*, the UE 115-*e*, and the RIS 505 may be performed in different orders or at different times. Some operations may also be omitted from the process flow 500, and other operations may be added to the process flow 500. In the example of FIG. 5, the base station 105-*d* and the UE 115-*e* may perform wireless communications via a RIS 505.

At 510, the RIS 505 may transmit a capability indication to the base station 105-*d*. The capability indication may provide information related the RIS 505 capability to perform training procedures based on random selection of phase parameters or phase and amplitude parameters. In some cases, the capability indication may provide a range of phase values or a range of phase and amplitude values over which the RIS 505 may make adjustments. In some cases, the capability indication may indicate a resolution (e.g., a step size) of adjustments.

At 515, the base station 105-*d* may transmit a configuration message to the RIS 505. The configuration message may be transmitted to the RIS 505 using a wireless connection (e.g., using a same or different radio access network at used for communications between the UE 115-*e* and the base station 105-*d*), a wired connection (e.g., a wired backhaul connection), or combinations thereof. At 520, the base station 105-*d* may transmit a configuration message to the UE 115-*e*. The configuration message to the UE 115-*e* may be transmitted using RRC signaling, a MAC-CE, a DCI transmission, or any combinations thereof, and may be transmitted via the RIS 505 or directly to the UE 115-*e*. In some cases, the configuration information transmitted to the RIS 505 and UE 115-*e* may provide an indication of one or more training procedures configuration and one or more sets of reference signals associated with the training procedures. In some cases, the configuration messages may provide one set of reference signals (e.g., K reference signals) and associated time index values, or may provide multiple sets of reference signals (e.g., K1, K2, K3 reference signals) and associated time indices for multiple stages of a training procedure.

Based on the configuration, the base station 105-*d* may transmit the set of reference signals as 525 through 535, which may be monitored at the UE 115-*e*. In some cases, the RIS 505 may apply a different set of parameters to RIS elements for each reference signal, where each different set of parameters may be selected randomly from a set of available parameters. In some cases, the parameters may be different phase parameters that provide different beam directions for the reflected signal from the RIS 505. In some cases, the parameters may be different amplitude parameters that provide different beam directions and widths for the reflected signal.

At 540, the UE 115-*e* may generate a measurement report that is based on the measurements of the transmitted reference signals. In some cases, the measurement report may include an indication of a time index value that is associated with one of the reference signals that has a highest or an acceptable channel metric based on measurements performed at the UE 115-*e*. In some cases, multiple measurement reports may be provided for different stages of the training procedure, as discussed herein. At 545, the UE 115-*e* may transmit the measurement report to the base station 105-*e*, which may be transmitted directly or via the MS 505.

At 550, the base station 105-*e* may select the reference signal index for communications with the UE 115-*e* based at least in part on the measurement report. In some case, the base station 105-*e* may select the reference signal index that has a highest channel quality metric (e.g., a highest RSRP), or a reference signal that has an acceptable channel quality metric. At 555, the base station 105-*d* may transmit a reference signal index indication to the MS 505, and at 560 the base station 105-*d* may transmit the reference signal index indication to the UE 115-*e* (e.g., via the MS 505).

At 565, the UE 115-*e* may set a precoder (e.g., a non-codebook precoder) based at least in part on the indicated reference signal index. At 570, the RIS 505 may set MS parameters (e.g., phase or phase and amplitude parameters) based on the reference signal index provided by the base station 105-*d*. In some cases, the MS parameters used for a particular reference signal index may be stored at the RIS 505 and used for setting MS elements based on the indication of the reference signal index. At 575, the base station 105-*d* may set a precoder based on the indicated reference signal index.

Optionally, at 580, the UE 115-*e*, base station 105-*d*, and RIS 505 may perform a UE-side reference signal training procedure in a similar manner as described for the base station 105-*d*. At 585, the UE 115-*e* may transmit uplink communications to the base station 105-*e* via the RIS 505. At 590, the base station 105-*d* may transmit downlink communications to the UE 115-*e* via the RIS 505.

Figure 6:
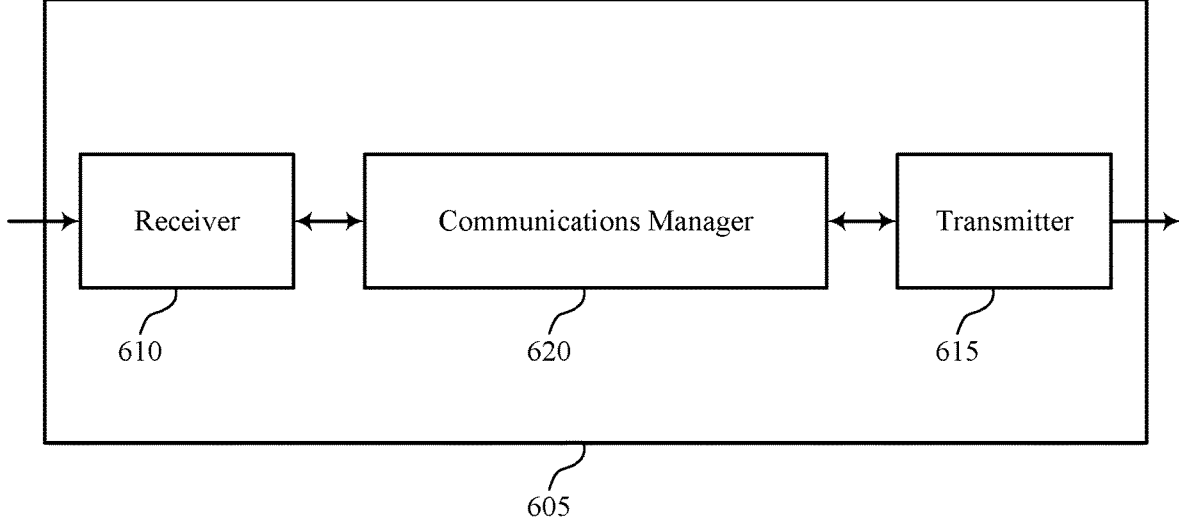
FIGS. 6 and 7 show block diagrams of devices that support beamforming techniques using random-based parameter selection at RISs in accordance with aspects of the present disclosure.

FIG. 6 shows a block diagram 600 of a device 605 that supports beamforming techniques using random-based parameter selection at RISs in accordance with aspects of the present disclosure. The device 605 may be an example of aspects of a UE 115 or base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beamforming techniques using random-based parameter selection at RISs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beamforming techniques using random-based parameter selection at RISs). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of beamforming techniques using random-based parameter selection at RISs as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device in accordance with examples as disclosed herein. For example, the communications manager 620 may be configured as or otherwise support a means for transmitting a set of reference signals to a second device via a configurable surface that is separate from the first device and the second device, where the configurable surface has a set of multiple configurable surface elements, and one or more transmission parameters of at least a subset of the set of multiple configurable surface elements is selected randomly at the configurable surface for one or more reference signals of the set of reference signals, and where each reference signal of the set of reference signals has a corresponding reference signal index value. The communications manager 620 may be configured as or otherwise support a means for receiving, from the second device, a first indication of a first reference signal index value of the set of reference signals based on channel quality measurements of the set of reference signals. The communications manager 620 may be configured as or otherwise support a means for transmitting, using beamforming that is based on the first indication, a data transmission to the second device via the configurable surface.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for training RISs based on randomly selected RIS parameters. These techniques may support more efficient utilization of communication resources by increasing the gain for uplink and downlink communications via RIS devices, thus resulting in enhanced communications reliability, and reducing processing overhead (e.g. by reducing dropped or impacted signals).

Figure 7:
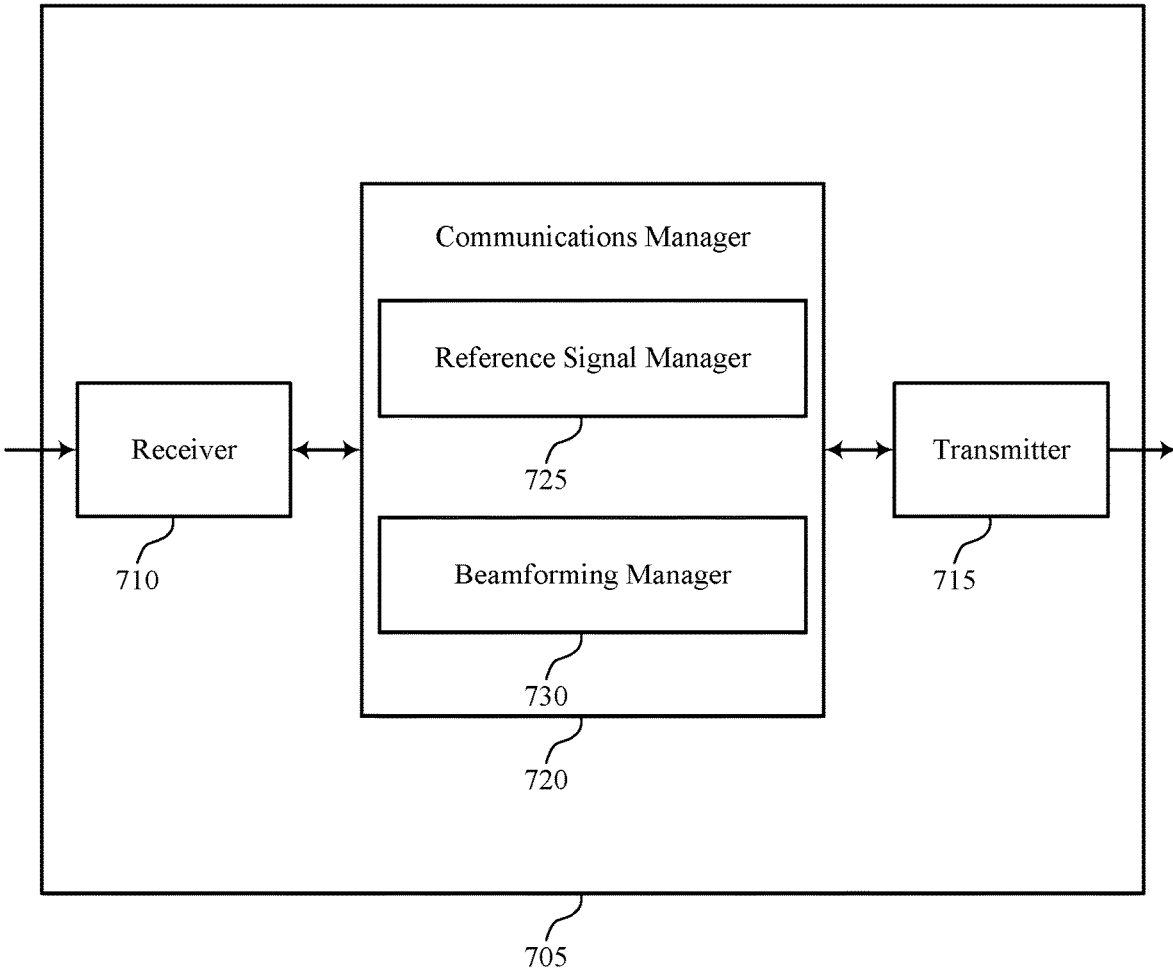

FIG. 7 shows a block diagram 700 of a device 705 that supports beamforming techniques using random-based parameter selection at RISs in accordance with aspects of the present disclosure. The device 705 may be an example of aspects of a device 605 or a UE 115 or base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to beamforming techniques using random-based parameter selection at RISs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to beamforming techniques using random-based parameter selection at RISs). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of beamforming techniques using random-based parameter selection at RISs as described herein. For example, the communications manager 720 may include a reference signal manager 725 a beamforming manager 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device in accordance with examples as disclosed herein. The reference signal manager 725 may be configured as or otherwise support a means for transmitting a set of reference signals to a second device via a configurable surface that is separate from the first device and the second device, where the configurable surface has a set of multiple configurable surface elements, and one or more transmission parameters of at least a subset of the set of multiple configurable surface elements is selected randomly at the configurable surface for one or more reference signals of the set of reference signals, and where each reference signal of the set of reference signals has a corresponding reference signal index value. The reference signal manager 725 may be configured as or otherwise support a means for receiving, from the second device, a first indication of a first reference signal index value of the set of reference signals based on channel quality measurements of the set of reference signals. The beamforming manager 730 may be configured as or otherwise support a means for transmitting, using beamforming that is based on the first indication, a data transmission to the second device via the configurable surface.

Figure 8:
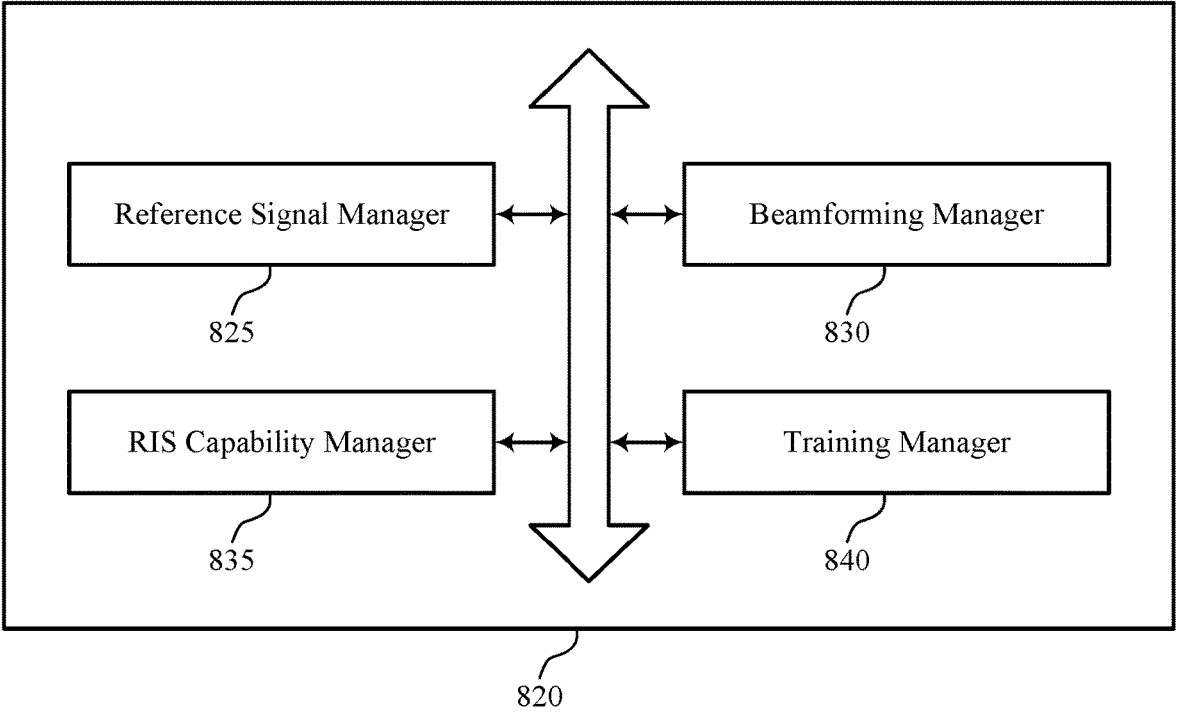
FIG. 8 shows a block diagram of a communications manager that supports beamforming techniques using random-based parameter selection at RISs in accordance with aspects of the present disclosure.
Figure 8:

FIG. 8 shows a block diagram 800 of a communications manager 820 that supports beamforming techniques using random-based parameter selection at RISs in accordance with aspects of the present disclosure. The communications manager 820 may be an example of aspects of a communications manager 620, a communications manager 720, or both, as described herein. The communications manager 820, or various components thereof, may be an example of means for performing various aspects of beamforming techniques using random-based parameter selection at RISs as described herein. For example, the communications manager 820 may include a reference signal manager 825, a beamforming manager 830, a RIS capability manager 835, a training manager 840, or any combination thereof. Each of these components may communicate, directly or indirectly, with one another (e.g., via one or more buses).

The communications manager 820 may support wireless communication at a first device in accordance with examples as disclosed herein. The reference signal manager 825 may be configured as or otherwise support a means for transmitting a set of reference signals to a second device via a configurable surface that is separate from the first device and the second device, where the configurable surface has a set of multiple configurable surface elements, and one or more transmission parameters of at least a subset of the set of multiple configurable surface elements is selected randomly at the configurable surface for one or more reference signals of the set of reference signals, and where each reference signal of the set of reference signals has a corresponding reference signal index value. In some examples, the reference signal manager 825 may be configured as or otherwise support a means for receiving, from the second device, a first indication of a first reference signal index value of the set of reference signals based on channel quality measurements of the set of reference signals. The beamforming manager 830 may be configured as or otherwise support a means for transmitting, using beamforming that is based on the first indication, a data transmission to the second device via the configurable surface.

In some examples, the RIS capability manager 835 may be configured as or otherwise support a means for receiving, from the configurable surface, an indication of a capability to change one or more of a phase of one or more configurable surface elements of the set of multiple configurable surface elements, an amplitude of one or more configurable surface elements of the set of multiple configurable surface elements, or any combinations thereof, and where the set of reference signals are transmitted responsive to the indication. In some examples, the indication further provides a resolution and a range of one or more of available phase adjustments, available amplitude adjustments, or any combinations thereof.

In some examples, the reference signal manager 825 may be configured as or otherwise support a means for transmitting, to the configurable surface, an indication of the first reference signal index value for use in subsequent communications between the first device and the second device, where the configurable surface sets the one or more transmission parameters of the set of multiple configurable surface elements based on the first reference signal index value. In some examples, the set of reference signals is configured to include a quantity of reference signals that is based on a number of different phases available for measurement at the configurable surface, a number of configurable surface elements or subsets of configurable surface elements to be adjusted at the configurable surface, or any combinations thereof. In some examples, each reference signal index value corresponds to an index in time that is associated with a corresponding reference signal and a non-codebook beamforming phase set. In some examples, each reference signal of the set of reference signals is associated with a different phase, a different amplitude, or any combinations thereof, for multiple configurable surface elements or groups of configurable surface elements. In some examples, the different phases, the different amplitudes, or any combinations thereof, are randomly selected from a defined set of available adjustments.

In some examples, the set of reference signals is a first set of reference signals associated with a first training stage for a first transmission parameter of the configurable surface, and the training manager 840 may be configured as or otherwise support a means for transmitting a second set of reference signals associated with a second training stage to the second device via the configurable surface, where a second transmission parameter of at least the subset of the set of multiple configurable surface elements is selected randomly at the configurable surface for one or more reference signals of the second set of reference signals. In some examples, the set of reference signals is a first set of reference signals associated with a first training stage for a first transmission parameter of the configurable surface, and the training manager 840 may be configured as or otherwise support a means for receiving, from the second device, a second indication of a second reference signal index value of a second reference signal of the second set of reference signals based on channel quality measurements of the second set of reference signals. In some examples, the set of reference signals is a first set of reference signals associated with a first training stage for a first transmission parameter of the configurable surface, and the training manager 840 may be configured as or otherwise support a means for determining a beamforming codebook (e.g., a precoding codebook) based on the first indication and the second indication.

In some examples, the first training stage is for selection of a phase associated with one or more of the set of multiple configurable surface elements of the configurable surface, the second training stage is for selection of an amplitude of one or more of the set of multiple configurable surface elements of the configurable surface, and a third training stage is for joint training of both phase and amplitude of one or more of the set of multiple configurable surface elements of the configurable surface. In some examples, the first training stage and the second training stage are configured by RRC signaling, by DCI, or any combinations thereof. In some examples, each training stage has an independently configurable quantity of reference signals in the associated set of reference signals.

Figure 9:
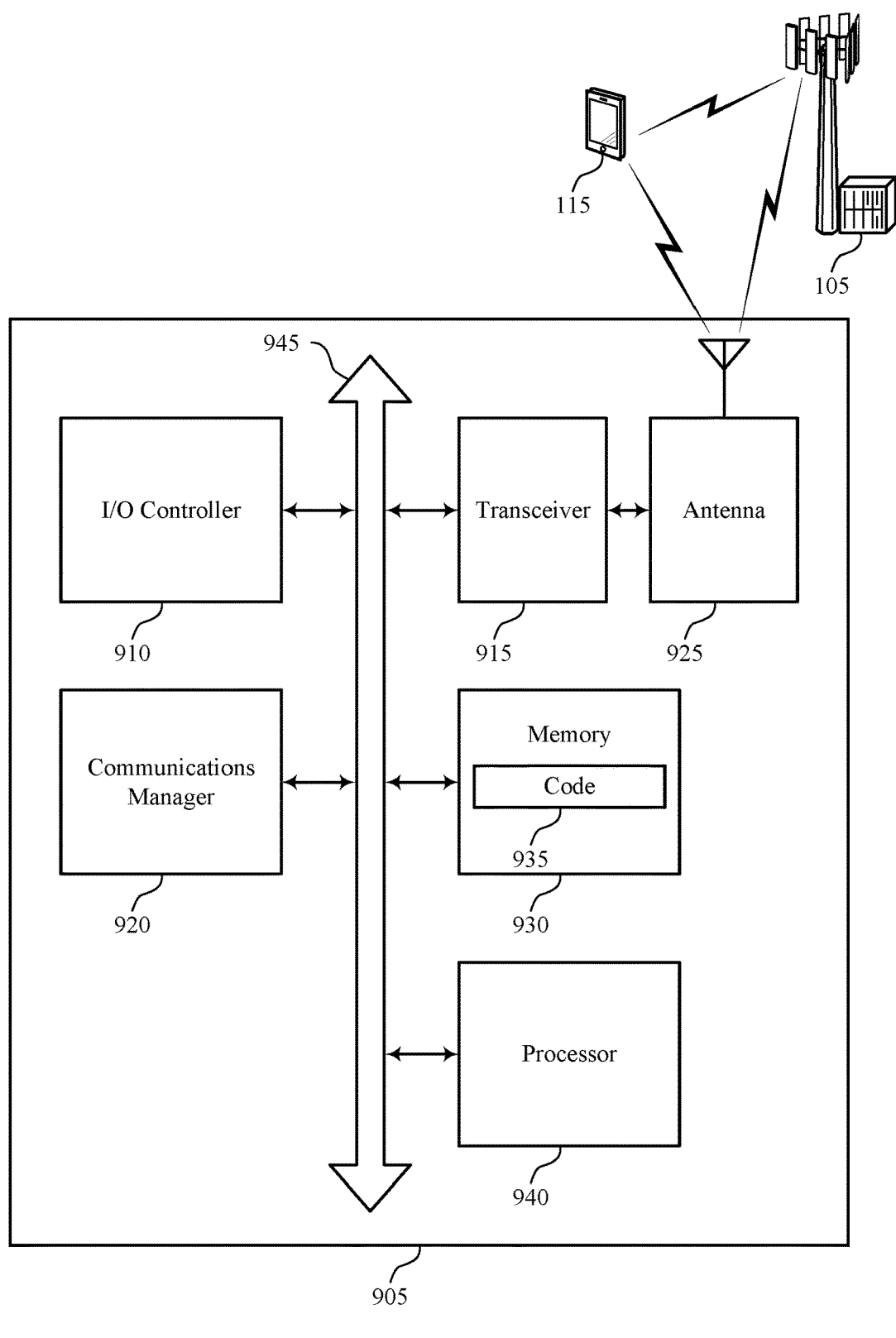
FIG. 9 shows a diagram of a system including a device that supports beamforming techniques using random-based parameter selection at RISs in accordance with aspects of the present disclosure.

FIG. 9 shows a diagram of a system 900 including a device 905 that supports beamforming techniques using random-based parameter selection at RISs in accordance with aspects of the present disclosure. The device 905 may be an example of or include the components of a device 605, a device 705, a UE 115, or a base station 105 as described herein. The device 905 may communicate wirelessly with one or more base stations 105, UEs 115, or any combination thereof. The device 905 may include components for bidirectional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bidirectionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting beamforming techniques using random-based parameter selection at RISs). For example, the device 905 or a component of the device 905 may include a processor 940 and memory 930 coupled to the processor 940, the processor 940 and memory 930 configured to perform various functions described herein.

The communications manager 920 may support wireless communication at a first device in accordance with examples as disclosed herein. For example, the communications manager 920 may be configured as or otherwise support a means for transmitting a set of reference signals to a second device via a configurable surface that is separate from the first device and the second device, where the configurable surface has a set of multiple configurable surface elements, and one or more transmission parameters of at least a subset of the set of multiple configurable surface elements is selected randomly at the configurable surface for one or more reference signals of the set of reference signals, and where each reference signal of the set of reference signals has a corresponding reference signal index value. The communications manager 920 may be configured as or otherwise support a means for receiving, from the second device, a first indication of a first reference signal index value of the set of reference signals based on channel quality measurements of the set of reference signals. The communications manager 920 may be configured as or otherwise support a means for transmitting, using beamforming that is based on the first indication, a data transmission to the second device via the configurable surface.

By including or configuring the communications manager 920 in accordance with examples as described herein, the device 905 may support techniques for training RISs based on randomly selected RIS parameters. These techniques may support more efficient utilization of communication resources by increasing the gain for uplink and downlink communications via MS devices, thus resulting in enhanced communications reliability, reduced latency, and reducing processing overhead (e.g. by reducing dropped or impacted signals).

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of beam-forming techniques using random-based parameter selection at RISs as described herein, or the processor 940 and the memory 930 may be otherwise configured to perform or support such operations.

Figure 10:
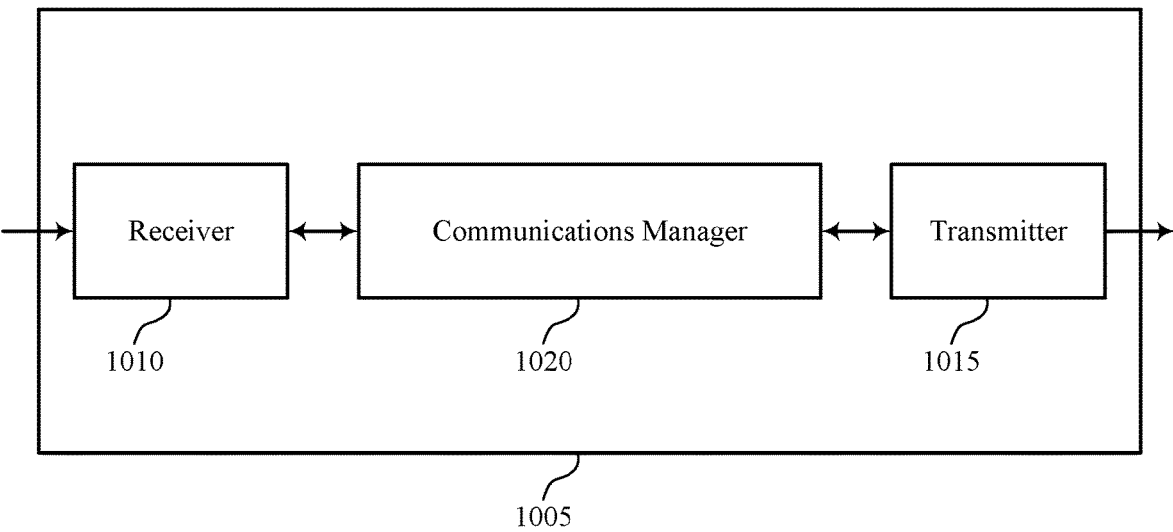
FIGS. 10 and 11 show block diagrams of devices that support beamforming techniques using random-based parameter selection at RISs in accordance with aspects of the present disclosure.

FIG. 10 shows a block diagram 1000 of a device 1005 that supports beamforming techniques using random-based parameter selection at RISs in accordance with aspects of the present disclosure. The device 1005 may be an example of aspects of a RIS as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to beamforming techniques using random-based parameter selection at RI S s). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to beamforming techniques using random-based parameter selection at RISs). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of beamforming techniques using random-based parameter selection at RISs as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a configurable surface in accordance with examples as disclosed herein. For example, the communications manager 1020 may be configured as or otherwise support a means for transmitting, to a base station, a capability indication of a capability to change one or more of a phase of one or more configurable surface elements of a set of multiple configurable surface elements at the configurable surface, an amplitude of one or more configurable surface elements of the set of multiple configurable surface elements, or any combinations thereof. The communications manager 1020 may be configured as or otherwise support a means for receiving, from the base station, configuration information for a beam training procedure that indicates a set of reference signals to be transmitted between the base station and a UE via the configurable surface. The communications manager 1020 may be configured as or otherwise support a means for setting one or more transmission parameters of at least a subset of the set of multiple configurable surface elements for each reference signal of the set of reference signals, where the one or more transmission parameters is selected randomly at the configurable surface for each reference signal, and where each reference signal of the set of reference signals has a corresponding reference signal index value. The communications manager 1020 may be configured as or otherwise support a means for retransmitting each received reference signal of the set of reference signals based on the corresponding one or more transmission parameters. The communications manager 1020 may be configured as or otherwise support a means for receiving, from the base station, an indication of a selected reference signal index value for use in subsequent communications between the UE and the base station.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for training RISs based on randomly selected RIS parameters. These techniques may support more efficient utilization of communication resources by increasing the gain for uplink and downlink communications via RIS devices, thus resulting in enhanced communications reliability, and reducing processing overhead (e.g. by reducing dropped or impacted signals).

Figure 11:
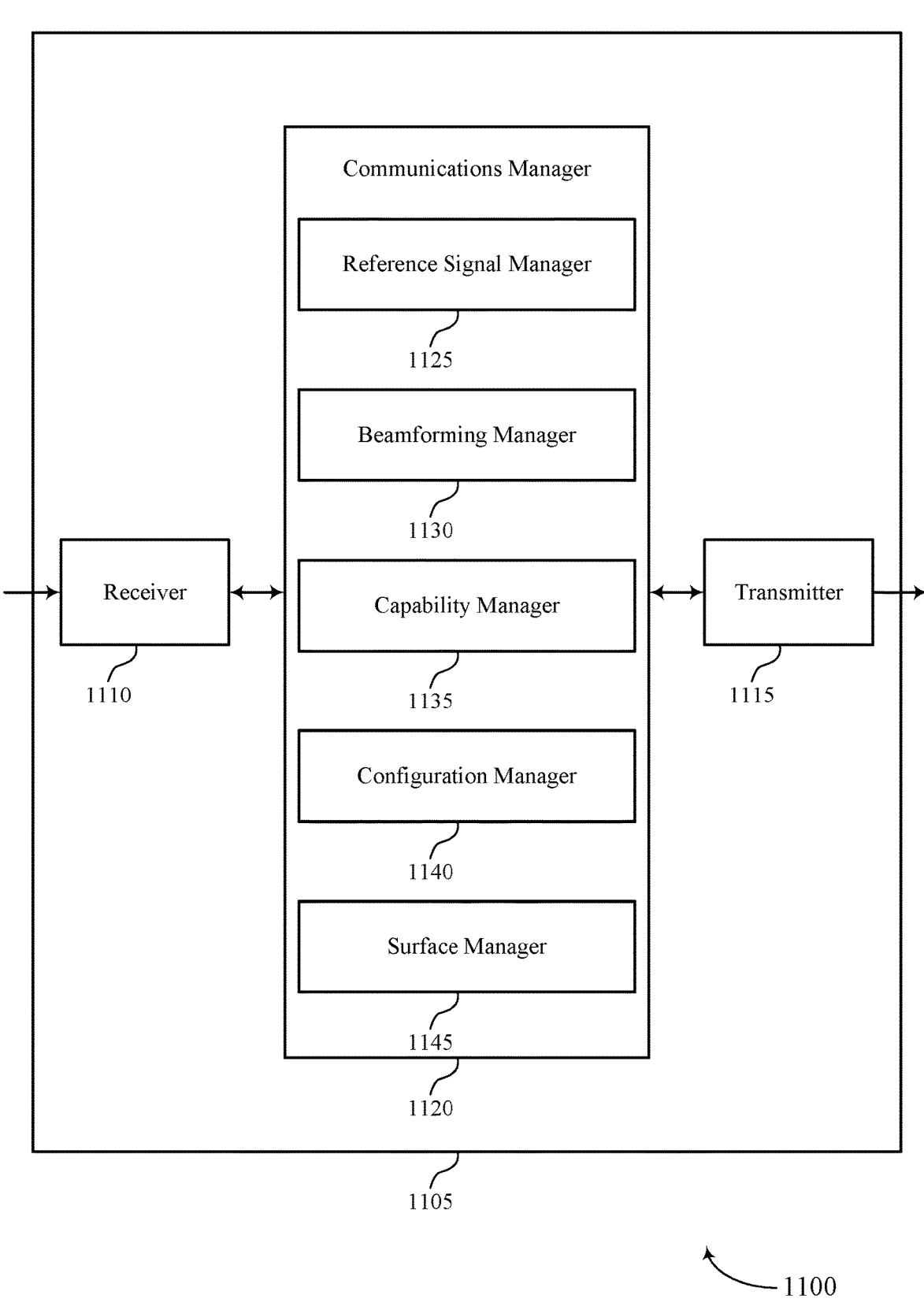

FIG. 11 shows a block diagram 1100 of a device 1105 that supports beamforming techniques using random-based parameter selection at RISs in accordance with aspects of the present disclosure. The device 1105 may be an example of aspects of a device 1005 or a RIS as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to beamforming techniques using random-based parameter selection at RISs). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to beamforming techniques using random-based parameter selection at RISs). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of beamforming techniques using random-based parameter selection at RISs as described herein. For example, the communications manager 1120 may include a reference signal manager 1125, a beamforming manager 1130, a capability manager 1135, a configuration manager 1140, a surface manager 1145, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a configurable surface in accordance with examples as disclosed herein. The capability manager 1135 may be configured as or otherwise support a means for transmitting, to a base station, a capability indication of a capability to change one or more of a phase of one or more configurable surface elements of a set of multiple configurable surface elements at the configurable surface, an amplitude of one or more configurable surface elements of the set of multiple configurable surface elements, or any combinations thereof. The configuration manager 1140 may be configured as or otherwise support a means for receiving, from the base station, configuration information for a beam training procedure that indicates a set of reference signals to be transmitted between the base station and a UE via the configurable surface. The surface manager 1145 may be configured as or otherwise support a means for setting one or more transmission parameters of at least a subset of the set of multiple configurable surface elements for each reference signal of the set of reference signals, where the one or more transmission parameters is selected randomly at the configurable surface for each reference signal, and where each reference signal of the set of reference signals has a corresponding reference signal index value. The surface manager 1145 may be configured as or otherwise support a means for retransmitting each received reference signal of the set of reference signals based on the corresponding one or more transmission parameters. The configuration manager 1140 may be configured as or otherwise support a means for receiving, from the base station, an indication of a selected reference signal index value for use in subsequent communications between the UE and the base station.

Figure 12:
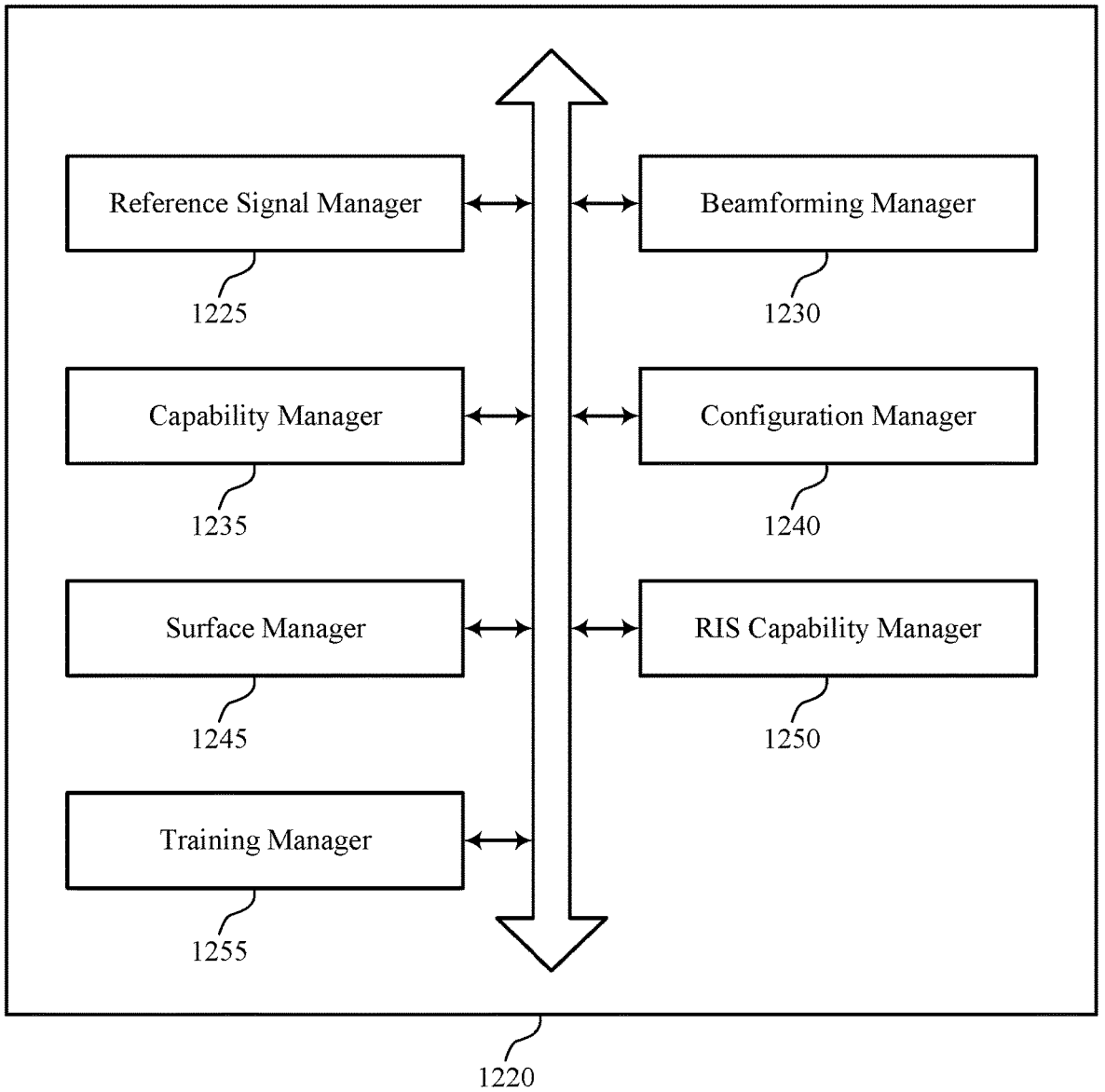
FIG. 12 shows a block diagram of a communications manager that supports beamforming techniques using random-based parameter selection at RISs in accordance with aspects of the present disclosure.

FIG. 12 shows a block diagram 1200 of a communications manager 1220 that supports beamforming techniques using random-based parameter selection at RISs in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of beamforming techniques using random-based parameter selection at RISs as described herein. For example, the communications manager 1220 may include a reference signal manager 1225, a beamforming manager 1230, a capability manager 1235, a configuration manager 1240, a surface manager 1245, a RIS capability manager 1250, a training manager 1255, or any combination thereof. Each of these components may communicate, directly or indirectly, with one another (e.g., via one or more buses).

The communications manager 1220 may support wireless communication at a configurable surface in accordance with examples as disclosed herein. The capability manager 1235 may be configured as or otherwise support a means for transmitting, to a base station, a capability indication of a capability to change one or more of a phase of one or more configurable surface elements of a set of multiple configurable surface elements at the configurable surface, an amplitude of one or more configurable surface elements of the set of multiple configurable surface elements, or any combinations thereof. The configuration manager 1240 may be configured as or otherwise support a means for receiving, from the base station, configuration information for a beam training procedure that indicates a set of reference signals to be transmitted between the base station and a UE via the configurable surface. The surface manager 1245 may be configured as or otherwise support a means for setting one or more transmission parameters of at least a subset of the set of multiple configurable surface elements for each reference signal of the set of reference signals, where the one or more transmission parameters is selected randomly at the configurable surface for each reference signal, and where each reference signal of the set of reference signals has a corresponding reference signal index value. In some examples, the surface manager 1245 may be configured as or otherwise support a means for retransmitting each received reference signal of the set of reference signals based on the corresponding one or more transmission parameters. In some examples, the configuration manager 1240 may be configured as or otherwise support a means for receiving, from the base station, an indication of a selected reference signal index value for use in subsequent communications between the UE and the base station.

In some examples, a quantity of reference signals in the set of reference signals is based on a number of different phases available for measurement at the configurable surface, a number of configurable surface elements or subsets of configurable surface elements to be adjusted at the configurable surface, or any combinations thereof. In some examples, the capability indication further provides a resolution and a range of one or more of available phase adjustments, available amplitude adjustments, or any combinations thereof. In some examples, each reference signal index value corresponds to an index in time that is associated with a corresponding set of transmission parameters of the set of multiple configurable surface elements. In some examples, each reference signal of the set of reference signals is associated with a different phase, a different amplitude, or any combinations thereof, for multiple configurable surface elements or groups of configurable surface elements at the configurable surface. In some examples, the different phases, the different amplitudes, or any combinations thereof, are randomly selected from a defined set of available adjustments. In some examples, the configuration information for the beam training procedure provides two or more sets of reference signals for two or more stages of training of the configurable surface.

In some examples, a first training stage is for phase training of the configurable surface, a second training stage is for amplitude training of the configurable surface, and a third training stage is for joint training of both phase and amplitude of the configurable surface. In some examples, the configuration information for the beam training procedure is received in one or more of RRC signaling, DCI, or any combinations thereof. In some examples, each stage of the two or more stages of training has an independently configurable quantity of reference signals in an associated set of reference signals.

Figure 13:
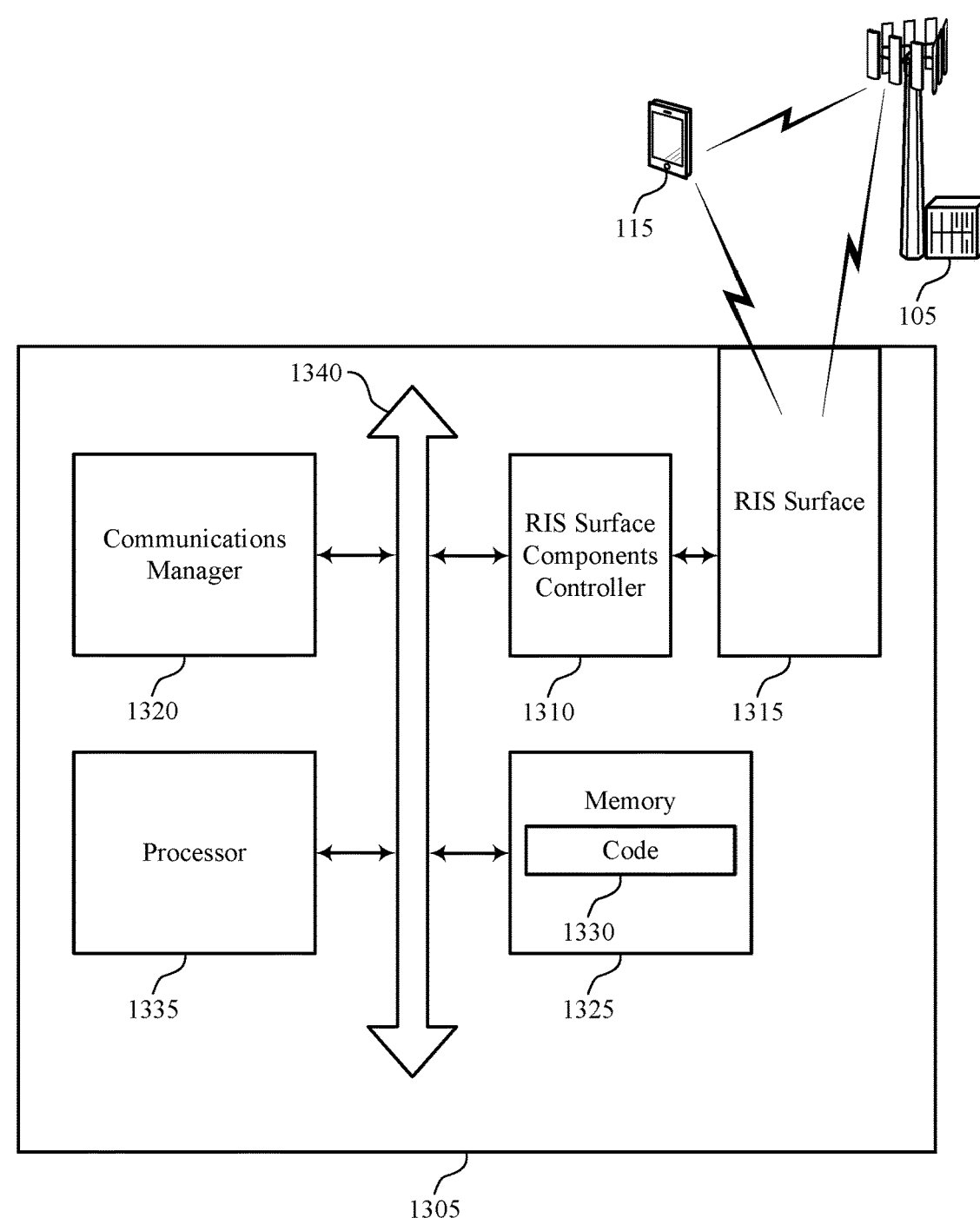
FIG. 13 shows a diagram of a system including a device that supports beamforming techniques using random-based parameter selection at RISs in accordance with aspects of the present disclosure.

FIG. 13 shows a diagram of a system 1300 including a device 1305 that supports beamforming techniques using random-based parameter selection at RISs in accordance with aspects of the present disclosure. The device 1305 may be an example of or include the components of a device 1005, a device 1105, or a RIS as described herein. The device 1305 may communicate wirelessly with one or more base stations 105, UEs 115, or any combination thereof. The device 1305 may include components for reflecting signals between devices, including components for transmitting and receiving communications, such as a communications manager 1320, a RIS surface components controller 1310 (e.g., a controller for tunable resistors and capacitors associated with each RIS element), an RIS surface 1315 (e.g., that include an array of RIS elements), a memory 1325, code 1330, and a processor 1335. These components may be in electronic communication or otherwise coupled (e.g., operatively, communicatively, functionally, electronically, electrically) via one or more buses (e.g., a bus 1340).

In some cases, the device 1305 may include one or more antennas for communicating with a base station (e.g., to provide capability information or receive configuration information, etc.). The RIS surface 1315 may reflect an impinging wave in a desired direction, via the one or more RIS elements, as described herein.

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting beamforming techniques using random-based parameter selection at RISs). For example, the device 1305 or a component of the device 1305 may include a processor 1335 and memory 1325 coupled to the processor 1335, the processor 1335 and memory 1325 configured to perform various functions described herein.

The communications manager 1320 may support wireless communication at a configurable surface in accordance with examples as disclosed herein. For example, the communications manager 1320 may be configured as or otherwise support a means for transmitting, to a base station, a capability indication of a capability to change one or more of a phase of one or more configurable surface elements of a set of multiple configurable surface elements at the configurable surface, an amplitude of one or more configurable surface elements of the set of multiple configurable surface elements, or any combinations thereof. The communications manager 1320 may be configured as or otherwise support a means for receiving, from the base station, configuration information for a beam training procedure that indicates a set of reference signals to be transmitted between the base station and a UE via the configurable surface. The communications manager 1320 may be configured as or otherwise support a means for setting one or more transmission parameters of at least a subset of the set of multiple configurable surface elements for each reference signal of the set of reference signals, where the one or more transmission parameters is selected randomly at the configurable surface for each reference signal, and where each reference signal of the set of reference signals has a corresponding reference signal index value. The communications manager 1320 may be configured as or otherwise support a means for retransmitting each received reference signal of the set of reference signals based on the corresponding one or more transmission parameters. The communications manager 1320 may be configured as or otherwise support a means for receiving, from the base station, an indication of a selected reference signal index value for use in subsequent communications between the UE and the base station.

By including or configuring the communications manager 1320 in accordance with examples as described herein, the device 1305 may support techniques for training RISs based on randomly selected RIS parameters. These techniques may support more efficient utilization of communication resources by increasing the gain for uplink and downlink communications via RIS devices, thus resulting in enhanced communications reliability, and reducing processing overhead (e.g. by reducing dropped or impacted signals).

In some examples, the communications manager 1320 may be configured to perform various operations (e.g., receiving, monitoring, transmitting) using or otherwise in cooperation with the RIS surface components controller 1310, the RIS surface 1315, or any combination thereof. Although the communications manager 1320 is illustrated as a separate component, in some examples, one or more functions described with reference to the communications manager 1320 may be supported by or performed by the processor 1335, the memory 1325, the code 1330, or any combination thereof. For example, the code 1330 may include instructions executable by the processor 1335 to cause the device 1305 to perform various aspects of beamforming techniques using random-based parameter selection at RISs as described herein, or the processor 1335 and the memory 1325 may be otherwise configured to perform or support such operations.

FIG. 14 shows a flowchart illustrating a method 1400 that supports beamforming techniques using random-based parameter selection at RISs in accordance with aspects of the present disclosure. The operations of the method 1400 may be implemented by a UE or a base station or its components as described herein. For example, the operations of the method 1400 may be performed by a UE 115 or base station as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include transmitting a set of reference signals to a second device via a configurable surface that is separate from the first device and the second device, where the configurable surface has a set of multiple configurable surface elements, and one or more transmission parameters of at least a subset of the set of multiple configurable surface elements is selected randomly at the configurable surface for one or more reference signals of the set of reference signals, and where each reference signal of the set of reference signals has a corresponding reference signal index value. The operations of 1405 may be performed in accordance with examples as disclosed herein. In some examples, aspects of the operations of 1405 may be performed by a reference signal manager 825 as described with reference to FIG. 8.

At 1410, the method may include receiving, from the second device, a first indication of a first reference signal index value of the set of reference signals based on channel quality measurements of the set of reference signals. The operations of 1410 may be performed in accordance with examples as disclosed herein. In some examples, aspects of the operations of 1410 may be performed by a reference signal manager 825 as described with reference to FIG. 8.

At 1415, the method may include transmitting, using beamforming that is based on the first indication, a data transmission to the second device via the configurable surface. The operations of 1415 may be performed in accordance with examples as disclosed herein. In some examples, aspects of the operations of 1415 may be performed by a beamforming manager 830 as described with reference to FIG. 8.

FIG. 15 shows a flowchart illustrating a method 1500 that supports beamforming techniques using random-based parameter selection at RISs in accordance with aspects of the present disclosure. The operations of the method 1500 may be implemented by a UE or a base station or its components as described herein. For example, the operations of the method 1500 may be performed by a UE 115 or base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include receiving, from the configurable surface, an indication of a capability to change one or more of a phase of one or more configurable surface elements of the set of multiple configurable surface elements, an amplitude of one or more configurable surface elements of the set of multiple configurable surface elements, or any combinations thereof, and where the set of reference signals are transmitted responsive to the indication. The operations of 1505 may be performed in accordance with examples as disclosed herein. In some examples, aspects of the operations of 1505 may be performed by a RIS capability manager 835 as described with reference to FIG. 8.

At 1510, the method may include transmitting a set of reference signals to a second device via a configurable surface that is separate from the first device and the second device, where the configurable surface has a set of multiple configurable surface elements, and one or more transmission parameters of at least a subset of the set of multiple configurable surface elements is selected randomly at the configurable surface for one or more reference signals of the set of reference signals, and where each reference signal of the set of reference signals has a corresponding reference signal index value. The operations of 1510 may be performed in accordance with examples as disclosed herein. In some examples, aspects of the operations of 1510 may be performed by a reference signal manager 825 as described with reference to FIG. 8.

At 1515, the method may include receiving, from the second device, a first indication of a first reference signal index value of the set of reference signals based on channel quality measurements of the set of reference signals. The operations of 1515 may be performed in accordance with examples as disclosed herein. In some examples, aspects of the operations of 1515 may be performed by a reference signal manager 825 as described with reference to FIG. 8.

At 1520, the method may include transmitting, to the configurable surface, an indication of the first reference signal index value for use in subsequent communications between the first device and the second device, where the configurable surface sets the one or more transmission parameters of the set of multiple configurable surface elements based on the first reference signal index value. The operations of 1520 may be performed in accordance with examples as disclosed herein. In some examples, aspects of the operations of 1520 may be performed by a reference signal manager 825 as described with reference to FIG. 8.

At 1525, the method may include transmitting, using beamforming that is based on the first indication, a data transmission to the second device via the configurable surface. The operations of 1525 may be performed in accordance with examples as disclosed herein. In some examples, aspects of the operations of 1525 may be performed by a beamforming manager 830 as described with reference to FIG. 8.

FIG. 16 shows a flowchart illustrating a method 1600 that supports beamforming techniques using random-based parameter selection at RISs in accordance with aspects of the present disclosure. The operations of the method 1600 may be implemented by a UE or a base station or its components as described herein. For example, the operations of the method 1600 may be performed by a UE 115 or base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware.

At 1605, the method may include transmitting a set of reference signals to a second device via a configurable surface that is separate from the first device and the second device, where the configurable surface has a set of multiple configurable surface elements, and one or more transmission parameters of at least a subset of the set of multiple configurable surface elements is selected randomly at the configurable surface for one or more reference signals of the set of reference signals, and where each reference signal of the set of reference signals has a corresponding reference signal index value. The operations of 1605 may be performed in accordance with examples as disclosed herein. In some examples, aspects of the operations of 1605 may be performed by a reference signal manager 825 as described with reference to FIG. 8.

At 1610, the method may include receiving, from the second device, a first indication of a first reference signal index value of the set of reference signals based on channel quality measurements of the set of reference signals. The operations of 1610 may be performed in accordance with examples as disclosed herein. In some examples, aspects of the operations of 1610 may be performed by a reference signal manager 825 as described with reference to FIG. 8.

At 1615, the method may include transmitting a second set of reference signals associated with a second training stage to the second device via the configurable surface, where a second transmission parameter of at least the subset of the set of multiple configurable surface elements is selected randomly at the configurable surface for one or more reference signals of the second set of reference signals. The operations of 1615 may be performed in accordance with examples as disclosed herein. In some examples, aspects of the operations of 1615 may be performed by a training manager 840 as described with reference to FIG. 8.

At 1620, the method may include receiving, from the second device, a second indication of a second reference signal index value of a second reference signal of the second set of reference signals based on channel quality measurements of the second set of reference signals. The operations of 1620 may be performed in accordance with examples as disclosed herein. In some examples, aspects of the operations of 1620 may be performed by a training manager 840 as described with reference to FIG. 8.

At 1625, the method may include determining a beamforming codebook based on the first indication and the second indication. The operations of 1625 may be performed in accordance with examples as disclosed herein. In some examples, aspects of the operations of 1625 may be performed by a training manager 840 as described with reference to FIG. 8.

At 1630, the method may include transmitting, using beamforming that is based on the first indication and the second indication, a data transmission to the second device via the configurable surface. The operations of 1630 may be performed in accordance with examples as disclosed herein. In some examples, aspects of the operations of 1630 may be performed by a beamforming manager 830 as described with reference to FIG. 8.

FIG. 17 shows a flowchart illustrating a method 1700 that supports beamforming techniques using random-based parameter selection at RISs in accordance with aspects of the present disclosure. The operations of the method 1700 may be implemented by a RIS or its components as described herein. For example, the operations of the method 1700 may be performed by a RIS as described with reference to FIGS. 1 through 5 and 10 through 13. In some examples, a RIS may execute a set of instructions to control the functional elements of the RIS to perform the described functions. Additionally or alternatively, the RIS may perform aspects of the described functions using special-purpose hardware.

At 1705, the method may include transmitting, to a base station, a capability indication of a capability to change one or more of a phase of one or more configurable surface elements of a set of multiple configurable surface elements at the configurable surface, an amplitude of one or more configurable surface elements of the set of multiple configurable surface elements, or any combinations thereof. The operations of 1705 may be performed in accordance with examples as disclosed herein. In some examples, aspects of the operations of 1705 may be performed by a capability manager 1235 as described with reference to FIG. 12.

At 1710, the method may include receiving, from the base station, configuration information for a beam training procedure that indicates a set of reference signals to be transmitted between the base station and a UE via the configurable surface. The operations of 1710 may be performed in accordance with examples as disclosed herein. In some examples, aspects of the operations of 1710 may be performed by a configuration manager 1240 as described with reference to FIG. 12.

At 1715, the method may include setting one or more transmission parameters of at least a subset of the set of multiple configurable surface elements for each reference signal of the set of reference signals, where the one or more transmission parameters is selected randomly at the configurable surface for each reference signal, and where each reference signal of the set of reference signals has a corresponding reference signal index value. The operations of 1715 may be performed in accordance with examples as disclosed herein. In some examples, aspects of the operations of 1715 may be performed by a surface manager 1245 as described with reference to FIG. 12.

At 1720, the method may include retransmitting each received reference signal of the set of reference signals based on the corresponding one or more transmission parameters. The operations of 1720 may be performed in accordance with examples as disclosed herein. In some examples, aspects of the operations of 1720 may be performed by a surface manager 1245 as described with reference to FIG. 12.

At 1725, the method may include receiving, from the base station, an indication of a selected reference signal index value for use in subsequent communications between the UE and the base station. The operations of 1725 may be performed in accordance with examples as disclosed herein. In some examples, aspects of the operations of 1725 may be performed by a configuration manager 1240 as described with reference to FIG. 12.

The following provides an overview of aspects of the present disclosure:

Aspect 1: A method for wireless communication at a first device, comprising: transmitting a set of reference signals to a second device via a configurable surface that is separate from the first device and the second device, wherein the configurable surface has a plurality of configurable surface elements, and one or more transmission parameters of at least a subset of the plurality of configurable surface elements is selected randomly at the configurable surface for one or more reference signals of the set of reference signals, and wherein each reference signal of the set of reference signals has a corresponding reference signal index value; receiving, from the second device, a first indication of a first reference signal index value of the set of reference signals based at least in part on channel quality measurements of the set of reference signals; and transmitting, using beamforming that is based at least in part on the first indication, a data transmission to the second device via the configurable surface.

Aspect 2: The method of aspect 1, further comprising: receiving, from the configurable surface, an indication of a capability to change one or more of a phase of one or more configurable surface elements of the plurality of configurable surface elements, an amplitude of one or more configurable surface elements of the plurality of configurable surface elements, or any combinations thereof, and wherein the set of reference signals are transmitted responsive to the indication.

Aspect 3: The method of aspect 2, wherein the indication further provides a resolution and a range of one or more of available phase adjustments, available amplitude adjustments, or any combinations thereof.

Aspect 4: The method of any of aspects 1 through 3, further comprising: transmitting, to the configurable surface, an indication of the first reference signal index value for use in subsequent communications between the first device and the second device, wherein the configurable surface sets the one or more transmission parameters of the plurality of configurable surface elements based at least in part on the first reference signal index value.

Aspect 5: The method of any of aspects 1 through 4, wherein the set of reference signals is configured to include a quantity of reference signals that is based at least in part on a number of different phases available for measurement at the configurable surface, a number of configurable surface elements or subsets of configurable surface elements to be adjusted at the configurable surface, or any combinations thereof.

Aspect 6: The method of any of aspects 1 through 5, wherein each reference signal index value corresponds to an index in time that is associated with a corresponding reference signal and a non-codebook beamforming phase set.

Aspect 7: The method of any of aspects 1 through 6, wherein each reference signal of the set of reference signals is associated with a different phase, a different amplitude, or any combinations thereof, for multiple configurable surface elements or groups of configurable surface elements.

Aspect 8: The method of aspect 7, wherein the different phases, the different amplitudes, or any combinations thereof, are randomly selected from a defined set of available adjustments.

Aspect 9: The method of any of aspects 1 through 8, wherein the set of reference signals is a first set of reference signals associated with a first training stage for a first transmission parameter of the configurable surface, and wherein the method further comprises: transmitting a second set of reference signals associated with a second training stage to the second device via the configurable surface, wherein a second transmission parameter of at least the subset of the plurality of configurable surface elements is selected randomly at the configurable surface for one or more reference signals of the second set of reference signals; receiving, from the second device, a second indication of a second reference signal index value of a second reference signal of the second set of reference signals based at least in part on channel quality measurements of the second set of reference signals; and determining a beamforming codebook based at least in part on the first indication and the second indication.

Aspect 10: The method of aspect 9, wherein the first training stage is for selection of a phase associated with one or more of the plurality of configurable surface elements of the configurable surface, the second training stage is for selection of an amplitude of one or more of the plurality of configurable surface elements of the configurable surface, and a third training stage is for joint training of both phase and amplitude of one or more of the plurality of configurable surface elements of the configurable surface.

Aspect 11: The method of any of aspects 9 through 10, wherein the first training stage and the second training stage are configured by RRC signaling, by DCI, or any combinations thereof.

Aspect 12: The method of any of aspects 9 through 11, wherein each training stage has an independently configurable quantity of reference signals in the associated set of reference signals.

Aspect 13: A method for wireless communication at a configurable surface, comprising: transmitting, to a base station, a capability indication of a capability to change one or more of a phase of one or more configurable surface elements of a plurality of configurable surface elements at the configurable surface, an amplitude of one or more configurable surface elements of the plurality of configurable surface elements, or any combinations thereof; receiving, from the base station, configuration information for a beam training procedure that indicates a set of reference signals to be transmitted between the base station and a UE via the configurable surface; setting one or more transmission parameters of at least a subset of the plurality of configurable surface elements for each reference signal of the set of reference signals, wherein the one or more transmission parameters is selected randomly at the configurable surface for each reference signal, and wherein each reference signal of the set of reference signals has a corresponding reference signal index value; retransmitting each received reference signal of the set of reference signals based at least in part on the corresponding one or more transmission parameters; and receiving, from the base station, an indication of a selected reference signal index value for use in subsequent communications between the UE and the base station.

Aspect 14: The method of aspect 13, wherein a quantity of reference signals in the set of reference signals is based at least in part on a number of different phases available for measurement at the configurable surface, a number of configurable surface elements or subsets of configurable surface elements to be adjusted at the configurable surface, or any combinations thereof.

Aspect 15: The method of any of aspects 13 through 14, wherein the capability indication further provides a resolution and a range of one or more of available phase adjustments, available amplitude adjustments, or any combinations thereof.

Aspect 16: The method of any of aspects 13 through 15, wherein each reference signal index value corresponds to an index in time that is associated with a corresponding set of transmission parameters of the plurality of configurable surface elements.

Aspect 17: The method of any of aspects 13 through 16, wherein each reference signal of the set of reference signals is associated with a different phase, a different amplitude, or any combinations thereof, for multiple configurable surface elements or groups of configurable surface elements at the configurable surface.

Aspect 18: The method of aspect 17, wherein the different phases, the different amplitudes, or any combinations thereof, are randomly selected from a defined set of available adjustments.

Aspect 19: The method of any of aspects 13 through 18, wherein the configuration information for the beam training procedure provides two or more sets of reference signals for two or more stages of training of the configurable surface.

Aspect 20: The method of aspect 19, wherein a first training stage is for phase training of the configurable surface, a second training stage is for amplitude training of the configurable surface, and a third training stage is for joint training of both phase and amplitude of the configurable surface.

Aspect 21: The method of any of aspects 19 through 20, wherein the configuration information for the beam training procedure is received in one or more of RRC signaling, DCI, or any combinations thereof.

Aspect 22: The method of any of aspects 19 through 21, wherein each stage of the two or more stages of training has an independently configurable quantity of reference signals in an associated set of reference signals.

Aspect 23: An apparatus for wireless communication at a first device, comprising a processor; memory coupled with the processor; and instructions stored in the memory and executable by the processor to cause the apparatus to perform a method of any of aspects 1 through 12.

Aspect 24: An apparatus for wireless communication at a first device, comprising at least one means for performing a method of any of aspects 1 through 12.

Aspect 25: A non-transitory computer-readable medium storing code for wireless communication at a first device, the code comprising instructions executable by a processor to perform a method of any of aspects 1 through 12.

Aspect 26: An apparatus for wireless communication at a configurable surface, comprising a processor; memory coupled with the processor; and instructions stored in the memory and executable by the processor to cause the apparatus to perform a method of any of aspects 13 through 22.

Aspect 27: An apparatus for wireless communication at a configurable surface, comprising at least one means for performing a method of any of aspects 13 through 22.

Aspect 28: A non-transitory computer-readable medium storing code for wireless communication at a configurable surface, the code comprising instructions executable by a processor to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:

transmitting a set of reference signals to a second device via a configurable surface that is separate from the first device and the second device, wherein the configurable surface has a plurality of configurable surface elements, and one or more transmission parameters of at least a subset of the plurality of configurable surface elements is selected randomly at the configurable surface for one or more reference signals of the set of reference signals, and wherein each reference signal of the set of reference signals has a corresponding reference signal index value;

receiving, from the second device, a first indication of a first reference signal index value of the set of reference signals based at least in part on channel quality measurements of the set of reference signals; and transmitting, using beamforming that is based at least in part on the first indication, a data transmission to the second device via the configurable surface.

2. The method of claim 1, further comprising:

receiving, from the configurable surface, an indication of a capability to change one or more of a phase of one or more configurable surface elements of the plurality of configurable surface elements, an amplitude of one or more configurable surface elements of the plurality of configurable surface elements, or any combinations thereof, and wherein the set of reference signals are transmitted responsive to the indication.

3. The method of claim 2, wherein the indication further provides a resolution and a range of one or more of available phase adjustments, available amplitude adjustments, or any combinations thereof.

4. The method of claim 1, further comprising:

transmitting, to the configurable surface, an indication of the first reference signal index value for use in subsequent communications between the first device and the second device, wherein the configurable surface sets the one or more transmission parameters of the plurality of configurable surface elements based at least in part on the first reference signal index value.

5. The method of claim 1, wherein the set of reference signals is configured to include a quantity of reference signals that is based at least in part on a number of different phases available for measurement at the configurable surface, a number of configurable surface elements or subsets of configurable surface elements to be adjusted at the configurable surface, or any combinations thereof.

6. The method of claim 1, wherein each reference signal index value corresponds to an index in time that is associated with a corresponding reference signal and a non-codebook beamforming phase set.

7. The method of claim 1, wherein each reference signal of the set of reference signals is associated with a different phase, a different amplitude, or any combinations thereof, for multiple configurable surface elements or groups of configurable surface elements.

8. The method of claim 7, wherein the different phases, the different amplitudes, or any combinations thereof, are randomly selected from a defined set of available adjustments.

9. The method of claim 1, wherein the set of reference signals is a first set of reference signals associated with a first training stage for a first transmission parameter of the configurable surface, and wherein the method further comprises:

transmitting a second set of reference signals associated with a second training stage to the second device via the configurable surface, wherein a second transmission parameter of at least the subset of the plurality of configurable surface elements is selected randomly at the configurable surface for one or more reference signals of the second set of reference signals;

receiving, from the second device, a second indication of a second reference signal index value of a second reference signal of the second set of reference signals based at least in part on channel quality measurements of the second set of reference signals; and determining a beamforming codebook based at least in part on the first indication and the second indication.

10. The method of claim 9, wherein the first training stage is for selection of a phase associated with one or more of the plurality of configurable surface elements of the configurable surface, the second training stage is for selection of an amplitude of one or more of the plurality of configurable surface elements of the configurable surface, and a third training stage is for joint training of both phase and amplitude of one or more of the plurality of configurable surface elements of the configurable surface.

11. The method of claim 9, wherein the first training stage and the second training stage are configured by radio resource control (RRC) signaling, by downlink control information (DCI), or any combinations thereof.

12. The method of claim 9, wherein each training stage has an independently configurable quantity of reference signals in the associated set of reference signals.

13. A method for wireless communication at a configurable surface, comprising:

transmitting, to a base station, a capability indication of a capability to change one or more of a phase of one or more configurable surface elements of a plurality of configurable surface elements at the configurable surface, an amplitude of one or more configurable surface elements of the plurality of configurable surface elements, or any combinations thereof;

receiving, from the base station, configuration information for a beam training procedure that indicates a set of reference signals to be transmitted between the base station and a user equipment (UE) via the configurable surface;

setting one or more transmission parameters of at least a subset of the plurality of configurable surface elements for each reference signal of the set of reference signals, wherein the one or more transmission parameters is selected randomly at the configurable surface for each reference signal, and wherein each reference signal of the set of reference signals has a corresponding reference signal index value;

retransmitting each received reference signal of the set of reference signals based at least in part on the corresponding one or more transmission parameters; and receiving, from the base station, an indication of a selected reference signal index value for use in subsequent communications between the UE and the base station.

14. The method of claim 13, wherein a quantity of reference signals in the set of reference signals is based at least in part on a number of different phases available for measurement at the configurable surface, a number of configurable surface elements or subsets of configurable surface elements to be adjusted at the configurable surface, or any combinations thereof.

15. The method of claim 13, wherein the capability indication further provides a resolution and a range of one or more of available phase adjustments, available amplitude adjustments, or any combinations thereof.

16. The method of claim 13, wherein each reference signal index value corresponds to an index in time that is associated with a corresponding set of transmission parameters of the plurality of configurable surface elements.

17. The method of claim 13, wherein each reference signal of the set of reference signals is associated with a different phase, a different amplitude, or any combinations thereof, for multiple configurable surface elements or groups of configurable surface elements at the configurable surface.

18. The method of claim 17, wherein the different phases, the different amplitudes, or any combinations thereof, are randomly selected from a defined set of available adjustments.

19. The method of claim 13, wherein the configuration information for the beam training procedure provides two or more sets of reference signals for two or more stages of training of the configurable surface.

20. The method of claim 19, wherein a first training stage is for phase training of the configurable surface, a second training stage is for amplitude training of the configurable surface, and a third training stage is for joint training of both phase and amplitude of the configurable surface.

21. The method of claim 19, wherein the configuration information for the beam training procedure is received in one or more of radio resource control (RRC) signaling, downlink control information (DCI), or any combinations thereof.

22. The method of claim 19, wherein each stage of the two or more stages of training has an independently configurable quantity of reference signals in an associated set of reference signals.

23. An apparatus for wireless communication at a first device, comprising:

means for transmitting a set of reference signals to a second device via a configurable surface that is separate from the first device and the second device, wherein the configurable surface has a plurality of configurable surface elements, and one or more transmission parameters of at least a subset of the plurality of configurable surface elements is selected randomly at the configurable surface for one or more reference signals of the set of reference signals, and wherein each reference signal of the set of reference signals has a corresponding reference signal index value;

means for receiving, from the second device, a first indication of a first reference signal index value of the set of reference signals based at least in part on channel quality measurements of the set of reference signals; and means for transmitting, using beamforming that is based at least in part on the first indication, a data transmission to the second device via the configurable surface.

24. The apparatus of claim 23, further comprising:

means for receiving, from the configurable surface, an indication of a capability to change one or more of a phase of one or more configurable surface elements of the plurality of configurable surface elements, an amplitude of one or more configurable surface elements of the plurality of configurable surface elements, or any combinations thereof, and wherein the set of reference signals are transmitted responsive to the indication.

25. The apparatus of claim 23, further comprising:

means for transmitting, to the configurable surface, an indication of the first reference signal index value for use in subsequent communications between the first device and the second device, wherein the configurable surface sets the one or more transmission parameters of the plurality of configurable surface elements based at least in part on the first reference signal index value.

26. The apparatus of claim 23, wherein the set of reference signals is a first set of reference signals associated with a first training stage for a first transmission parameter of the configurable surface, the apparatus further comprising:

means for transmitting a second set of reference signals associated with a second training stage to the second device via the configurable surface, wherein a second transmission parameter of at least the subset of the plurality of configurable surface elements is selected randomly at the configurable surface for one or more reference signals of the second set of reference signals;

means for receiving, from the second device, a second indication of a second reference signal index value of a second reference signal of the second set of reference signals based at least in part on channel quality measurements of the second set of reference signals; and means for determining a beamforming codebook based at least in part on the first indication and the second indication.

27. An apparatus for wireless communication at a configurable surface, comprising:

means for transmitting, to a base station, a capability indication of a capability to change one or more of a phase of one or more configurable surface elements of a plurality of configurable surface elements at the configurable surface, an amplitude of one or more configurable surface elements of the plurality of configurable surface elements, or any combinations thereof;

means for receiving, from the base station, configuration information for a beam training procedure that indicates a set of reference signals to be transmitted between the base station and a user equipment (UE) via the configurable surface;

means for setting one or more transmission parameters of at least a subset of the plurality of configurable surface elements for each reference signal of the set of reference signals, wherein the one or more transmission parameters is selected randomly at the configurable surface for each reference signal, and wherein each reference signal of the set of reference signals has a corresponding reference signal index value;

means for retransmitting each received reference signal of the set of reference signals based at least in part on the corresponding one or more transmission parameters; and means for receiving, from the base station, an indication of a selected reference signal index value for use in subsequent communications between the UE and the base station.

28. The apparatus of claim 27, wherein a quantity of reference signals in the set of reference signals is based at least in part on a number of different phases available for measurement at the configurable surface, a number of configurable surface elements or subsets of configurable surface elements to be adjusted at the configurable surface, or any combinations thereof.

29. The apparatus of claim 27, wherein the capability indication further provides a resolution and a range of one or more of available phase adjustments, available amplitude adjustments, or any combinations thereof.

30. The apparatus of claim 27, wherein the configuration information for the beam training procedure provides two or more sets of reference signals for two or more stages of training of the configurable surface.

* * * * *